US006508555B1

(12) United States Patent
Sugawara

(10) Patent No.: US 6,508,555 B1
(45) Date of Patent: Jan. 21, 2003

(54) IMAGE PROJECTION SYSTEM THAT ENABLES ALMOST COMPLETE SUPERPOSITION WITHOUT ANY IMAGE SHIFT IN SUPERPOSITION PROJECTION OF ORIGINAL IMAGES A PLURALITY OF IMAGE PROJECTION APPARATUSES

(75) Inventor: Saburo Sugawara, Kawasaki (JP)

(73) Assignee: Canon Kabushiki Kaisha (JP)

( * ) Notice: Subject to any disclaimer, the term of this patent is extended or adjusted under 35 U.S.C. 154(b) by 124 days.

(21) Appl. No.: 09/658,224

(22) Filed: Sep. 8, 2000

(30) Foreign Application Priority Data

Sep. 9, 1999 (JP) ............................................. 11-255141

(51) Int. Cl.[7] ........................ G03B 21/00; G03B 21/14; G03B 21/26; G03B 3/00; G02B 15/14
(52) U.S. Cl. .............................. 353/69; 353/7; 353/10; 353/48; 353/101; 353/102; 353/94; 359/676; 359/686; 359/687; 359/682
(58) Field of Search ............................. 353/70, 69, 94, 353/100, 101, 102, 10, 30, 46, 122, 48, 7; 359/676–692

(56) References Cited

U.S. PATENT DOCUMENTS

| 5,626,411 | A | * | 5/1997 | Takashi et al. ................ 353/94 |
| 5,856,884 | A | * | 1/1999 | Mercado ...................... 359/649 |
| 6,008,884 | A | * | 12/1999 | Yamaguchi et al. ...... 355/53.54 |
| 6,366,400 | B1 | * | 4/2002 | Ohzawa ........................ 359/434 |
| 2001/0013978 | A1 | * | 8/2001 | Mihara ......................... 359/680 |

FOREIGN PATENT DOCUMENTS

| JP | 7-104186 | 4/1995 | ........... G02B/15/20 |
| JP | 8-50241 | 2/1996 | ........... G02B/15/16 |
| JP | 9-21953 | 1/1997 | ........... G02B/15/16 |

* cited by examiner

Primary Examiner—Russell Adams
Assistant Examiner—Melissa Koval
(74) Attorney, Agent, or Firm—Morgan & Finnegan, L.L.P.

(57) ABSTRACT

For providing the image projecting system capable of substantially superimposing images without image blur which are provided from a plurality of image projecting apparatus when the original images are superimposed using the plurality of image projecting apparatus, distortion value of distortion aberration of images from projecting optical system comprised in the image projecting system is made substantially coincided in a region of using image height.

12 Claims, 24 Drawing Sheets

IMAGE PROJECTION SYSTEM THAT ENABLES ALMOST COMPLETE SUPERPOSITION WITHOUT ANY IMAGE SHIFT IN SUPERPOSITION PROJECTION OF ORIGINAL IMAGES A PLURALITY OF IMAGE PROJECTION APPARATUSES

BACKGROUND OF THE INVENTION

1. Field of the Invention

The present invention relates to an image projection system capable of almost completely superposing the projection images of a plurality of original images by a plurality of image projection apparatuses without any image shift.

2. Related Background Art

For a conventional image projection system for superposing and projecting a plurality of projection images, the present assignee has proposed a projecting lens for increasing the brightness of a projection image in Japanese Laid-Open Patent Application Nos. 7-104186, 8-50241, and 9-21953. According to these proposals, the brightness of a projection image can be increased when a plurality of projection images are superposed and projected by a plurality of image projection apparatuses.

In these prior arts, however, no proposals for the entire system have been made, and how to obtain an image projection system optimum for use conditions by setting relationships such as the distortion characteristic of the projecting lens, the optical axis interval of projectors, projection magnification, and the size and pixel pitch of the original image has not been made clear.

SUMMARY OF THE INVENTION

It is an object of the present invention to solve the above-described conventional problem and provide an image projection system which can completely superpose and project a plurality of projection images without any image shift.

According to one aspect of the invention, an image projection system for projecting a plurality of original images to substantially the same region through separate projection optical systems, satisfies the following condition (1), $$|K1|<0.25 \quad (1)$$

where $$K1 = -((L/\beta)/H)*DIS\max*0.0258/P$$

L: a maximum optical axis interval of the plurality of projection optical systems β: a projection magnification of the projection optical system DISmax: a maximum value of absolute values of slope of distortion in the image height range of 0.25 to 1 when the maximum image height of the projection optical systems is normalized to 1

H: a short-side length of the original image

P: a pixel pitch of the original image.

In further aspect of the invention, at least one of the projection optical systems and the original images is movable in a direction perpendicular to an optical axis of the projection optical systems.

In further aspect of the invention, the following condition is satisfied in an entire variable focal length range of the projection optical systems, DISmax<1.5.

In further aspect of the invention, the plurality of projection optical systems for projecting the plurality of original images have the same or substantially the same distortion characteristic.

In further aspect of the invention, when in the plurality of projection optical systems, letting S1 be a maximum interval (maximum shift amount) of intervals each between an optical axis of each projecting lens and a center of the original image projected by that projection optical system, and H be the short-side length of the original image, a ratio K2 (=S1/H) of S1 to H satisfies the following condition (2), $$0.35<|K2|<0.65 \quad (2).$$

In further aspect of the invention, the following condition (3) is satisfied, $$|K1|<0.18 \quad (1')$$

In further aspect of the invention, the projection optical systems each comprises a first lens unit having negative refracting power, a second lens unit having positive refracting power, a third lens unit having negative refracting power, a fourth lens unit having positive refracting power, and a fifth lens unit having positive refracting power sequentially from a screen side, and is designed to, in changing a focal length, move the second, third, and fourth lens unit in a direction of optical axis and adjust a focal position in accordance with a change in a distance from the projection optical system to a screen by the first lens unit, and the first lens unit has at least one aspherical lens.

In further aspect of the invention, the first lens unit has the aspherical surface on the screen side of a negative lens as a second component from the screen side.

In further aspect of the invention, a distortion in the projection optical system value of distortion in the projection optical system, is substantially constant in a range of image height used for projection.

One aspect of the invention provides an image projection apparatus having a projection optical system in which a distortion value of distortion is substantially constant in a range of image height used for projection.

In further aspect of the invention, the following condition is satisfied in an entire variable focal length range of the projection optical system in the image projection system, $$DIS\max<1.5.$$

DESCRIPTION OF THE PREFERRED EMBODIMENTS

A projection optical system and an image projection apparatus for superposing and projecting a plurality of projection images, which are disclosed in this embodiment, employ an arrangement in which the maximum value of the absolute value of distortion near the maximum wide-angle state of a projecting lens, and a change in distortion value at each part of an image height are made small whereby projection images can be almost completely superposed without any image shift.

Figure 1:
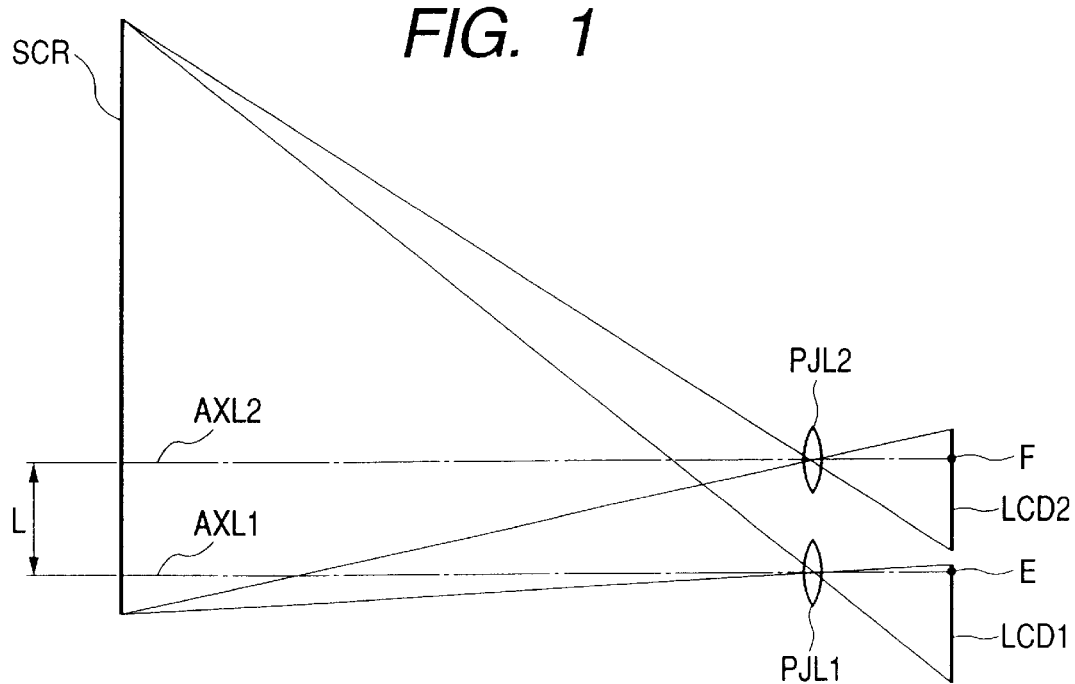
FIG. 1 is a principle chart for explaining superposition projection in the present invention.
Figure 2:
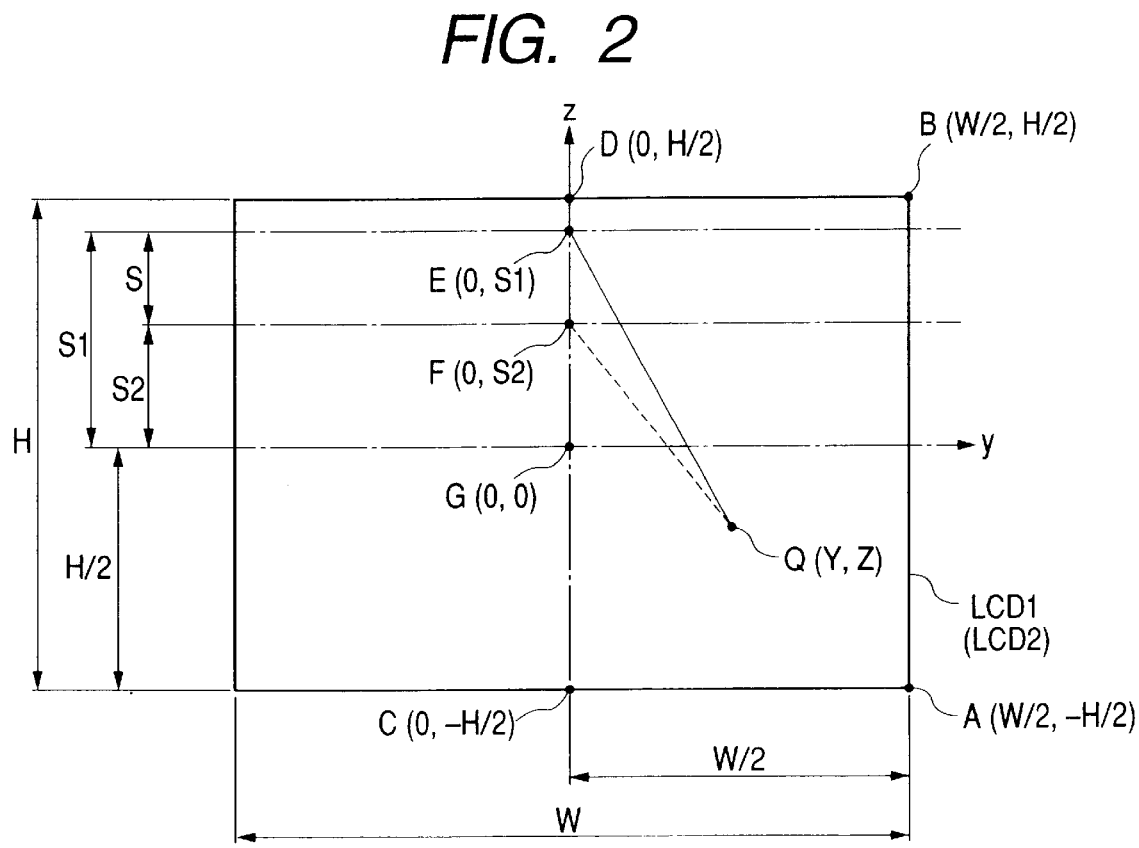
FIG. 2 is a coordinate chart showing superposition projection shown in FIG. 1 on a liquid crystal screen.

This will be described below in detail on the basis of FIG. 1 showing a principle chart of superposition projection, FIG. 2 showing a coordinate chart on a liquid crystal display, and distortion charts in this embodiment.

Referring to FIG. 1 showing the principle chart of superposition projection, a screen SCR is set parallel to liquid crystal panels LCD1 and LCD2, and projecting lenses PJL1 and PJL2 which correspond to the liquid crystal panels LCD1 and LCD2, respectively, and superpose projection images on the screen SCR.

The optical axes of the projecting lenses PJL1 and PJL2 are separated by an interval L from each other and arranged perpendicular to the screen SCR and liquid crystal panels LCD1 and LCD2. The liquid crystal panels are located at different positions with respect to the optical axes of the projecting lenses whereby the projection images projected from different positions completely match.

In this principle chart, the projection images can completely match only when distortion of each projecting lens is always 0 within the image circle used. If the projecting lenses occur distortion, the distance between a point on the liquid crystal surface of one of the two projectors, which corresponds to an arbitrary point projected on the screen, and a corresponding one of the projecting lens optical axes is different from that between a corresponding point of the other projector and the other projecting lens optical axis. For this reason, the projection image of the projecting lens PJL1 and that of the projecting lens PJL2 generate different distortions, resulting in difficulty in completely superposing the projection images.

The reason for this will be described in more detail.

FIG. 2 is a view showing coordinates on the liquid crystal surface of the principle chart of superposition projection shown in FIG. 1.

The center of the effective liquid crystal display surface (surrounded by the solid line) is represented by a point G, and the its coordinates are defined as (0,0).

A point E is the intersection between the liquid crystal surface and an optical axis AXL1 of the projecting lens PJL1 of the first projector.

A point F is the intersection between the liquid crystal surface and an optical axis AXL2 of the projecting lens PJL2 of the second projector.

Let H be the short-side length of the effective liquid crystal display surface, and W be the length in the long-side direction.

An arbitrary point on the effective liquid crystal display surface is represented by a point Q, and its coordinates are defined as (Y,Z).

Let S1 be the distance between the optical axis AXL1 of the projecting lens PJL1 of the first projector and the center of the display portion of the liquid crystal panel LCD1, and S2 be the distance between the optical axis AXL2 of the projecting lens PJL2 of the second projector and the center of the display portion of the liquid crystal panel LCD2.

A difference S between S1 and S2 is obtained by dividing the projecting lens optical axis interval L between the first projector and the second projector by a projection magnification P common to the projecting lenses PJL1 and PJL2. The distance S2 is defined by S1 and S.

$S = L/\beta$ $S2 = S1 - S$

The coordinate values of points A, B, C, and D on the liquid crystal panel are A(W/2,−H/2), B(W/2,H/2), C(0,−H/2), and D(0,H/2).

A length LQE of a line segment that connects the arbitrary point Q and the point E is given by $LQE = \sqrt{(Y^2 + (Z-S1)^2)}$ A length LQF of a line segment that connects the arbitrary point Q and the point F is given by $$LQF=\sqrt{(Y^2+(Z-S2)^2)}$$

The distortion value at an arbitrary image height H of the projecting lens is defined as DIST(T). An image shift amount at the point Q with reference to the point E (the converted value of the shift amount of the projection image on the liquid crystal surface when distortion is 0) is defined as follows.

$$h\Delta(LQE)=DIST(LQE)*Y \text{(long-side direction)}$$

$$v\Delta(LQE)=DIST(LQE)*(Z-S1) \text{(short-side direction)}$$

An image shift amount at the point Q with reference to the point F (the converted value of the shift amount of the projection image on the liquid crystal surface when distortion is 0) is defined as follows.

$$h\Delta(LQF)=DIST(LQF)*Y \text{(long-side direction)}$$

$$v\Delta(LQF)=DIST(LQF)*(Z-S2) \text{(short-side direction)}$$

Hence, the converted value of the image shift amount between the point Q of the projection image of the first projector and that of the second projector is determined as follows.
(long-side direction)

$$H\Delta=h\Delta(LQF)-h\Delta(LQE)=Y*(DIST(LQF)-DIST(LQE)) \quad (3)$$

(short-side direction)

$$V\Delta=v\Delta(LQF)-v\Delta(LQE)=DIST(LQF)*(Z-S2)-DIST(LQE)*(Z-S1) \quad (4)$$

In this state, however, the distance between point G and the intersection E between the liquid crystal panel and the optical axis of the projecting lens of the first projector in FIG. 2 is different from that between the point G and the intersection F between the liquid crystal panel and the optical axis of the projecting lens of the second projector. For this reason, an image shift between the first projector and the second projector occurs at the center of the projection image on the screen, which corresponds to the central point G of the liquid crystal panel.

To make the projection images at the center of the liquid crystal panels match, the optical axis AXL2 of the projecting lens PJL2 of the second projector is moved by a very small distance and corrected such that the two projection images completely match at the center of the projection screen.

The correction amount is obtained next.

The coordinates (0,0) of the center G of the liquid crystal surface are substituted into equations (3) and (4). When a length LGE of a line segment GE=S1, and a length LGF of a line segment GF=S2,
(long-side direction)

$$h\Delta(LGE)=DIST(LGE)*0=0$$

(short-side direction)

$$v\Delta(LGE)=DIST(LGE)*(0-S1)=-DIST(S1)*S1$$

(long-side direction)

$$h\Delta(LGF)=DIST(LGF)*0=0$$

(short-side direction)

$$v\Delta(LGF)=DIST(LGF)*(0-S2)=-DIST(S2)*S2$$

A correction amount P necessary for matching the centers of projection images of the two liquid crystal projectors is given by $$P=-DIST(S2)*S2+DIST(S1)*S1 \text{(short-side direction)} \quad (5)$$

Hence, when the centers of the projection images of the two liquid crystal projectors completely match, the converted amount, on the liquid crystal panel, of the image shift at a point on the screen, which corresponds to the arbitrary point Q, has the following values.
(long-side direction)

$$H\Delta=h\Delta(LQF)-h\Delta(LQE)=Y*(DIST(LQF)-DIST(LQE)) \quad (6)$$

(short-side direction)

$$V\Delta=v\Delta(LQF)-v\Delta(LQE)=DIST(LQF)*(Z-S2)-DIST(LQE)*(Z-S1)+DIST(S2)*S2-DIST(S1)*S1 \quad (7)$$

Hence, to reduce the image shift, for the long-side direction, the difference between DIST(LQF) and DIST(LQE) is made small, as is apparent from equation (6). On the other hand, if the arbitrary point Q is present near the center in the horizontal direction of the liquid crystal screen, the value Y is small. For this reason, even when the difference between DIST(LQF) and DIST(LQE) is large to some extent, the image shift is reduced.

For the short-side direction, the image shift becomes small when the difference between DIST(LQF) and DIST(LQE) is small, the difference between DIST(S1) and DIST(S2) is small, and the difference between S1 and S2 is small, as is apparent from equation (6). On the other hand, when (Z-S1) and (Z-S2) have small values, i.e., the arbitrary point Q is close to the intersections E and F between the liquid crystal panel and the optical axes of the projecting lenses, the image shift is reduced even when the difference between the distortion values is large to some extent.

Using the above equations, the degree of image shift was calculated on the basis of actual design values.

Figure 5:
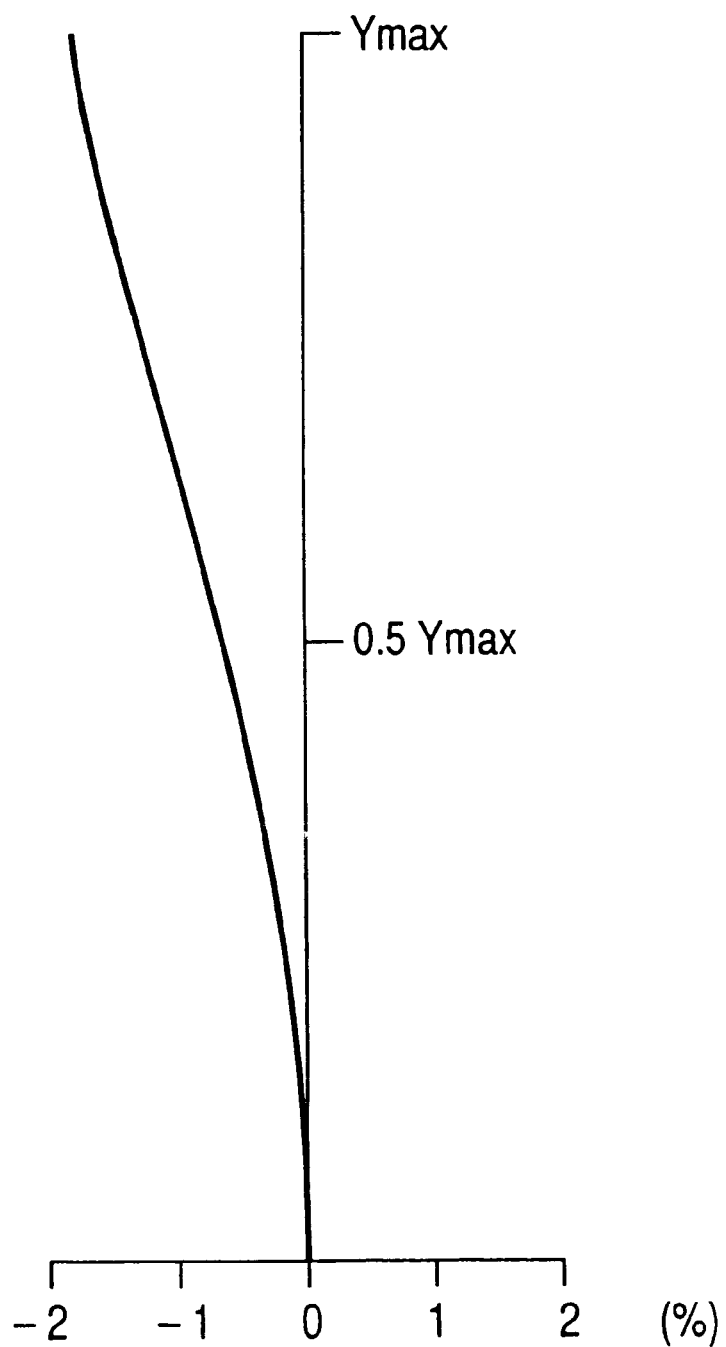
FIG. 5 is a distortion chart in the maximum wide-angle state of a conventional projecting lens.

FIG. 5 shows distortion in the maximum wide-angle state of a conventional projecting lens which does not take superposition projection into consideration. The absolute value of distortion becomes large toward the peripheral portion of the image circle.

Figure 6:
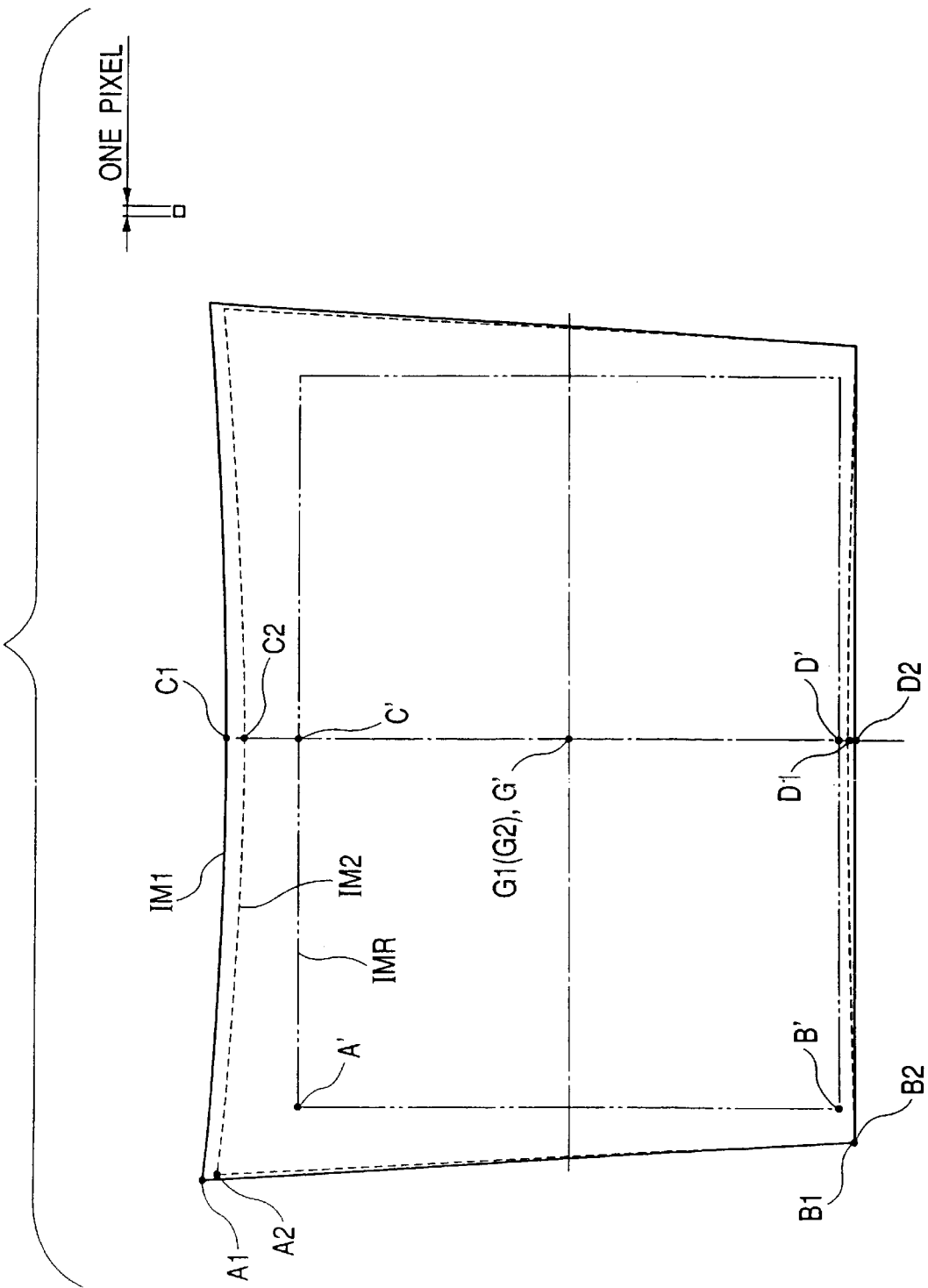
FIG. 6 is a view showing a pixel shift in the maximum wide-angle state of the conventional projecting lens.

When superposition projection shown in FIG. 1 is done using a projecting lens having such distortion, projection images shown in FIG. 6 are obtained on the screen. Referring to FIG. 6, the solid line indicates the shape of projection image by the first projector, and the broken line indicates the shape of projection image by the second projector. The alternate long and two short dashed line indicates a projection image when distortion is 0. For the illustrative convenience, the image shift is enlarged to about 10 times the actual size.

Referring to FIG. 6, a point A1 corresponds to the point A of the original image shown in FIG. 2, which is projected onto the screen by the first projector. Similarly, points B1, C1, D1, and G1 correspond to the points B, C, D, and G, respectively.

Referring to FIG. 6, a point A2 corresponds to the point A of the original image shown in FIG. 2, which is projected onto the screen by the second projector. Similarly, points B2, C2, D2, and G2 correspond to the points B, C, D, and G, respectively.

The reason why the distortion shape changes between the first projector and the second projector will be described.

First, the image shift between the projection images A1 and A2 at the point A is large, as shown in FIG. 6, because the difference between the distance between the point A and the intersection E between the original image and the optical axis of the projecting lens PJL1 of the first projector and the distance between the point A and the intersection F between the original image and the optical axis of the projecting lens PJL2 of the second projector is large, and the distance from the projecting lens optical axis is large.

The image shift is determined by the product of the distance from the projecting lens optical axis and the distortion value at that distance in the original image. For this reason, when the projecting lens has distortion for which the maximum value of the absolute value of the distortion value is large, and the absolute value of distortion becomes large as the image height increases, the image shift becomes large.

On the other hand, the image shift between the projection images B1 and B2 at the point B is small, as shown in FIG. 6, because the difference between the distance between the point B and the intersection E between the original image and the optical axis of the projecting lens PJL1 of the first projector and the distance between the point B and the intersection F between the original image and the optical axis of the projecting lens PJL2 of the second projector is small.

The image shift between the projection images C1 and C2 at the point C is large, as shown in FIG. 6, because the difference between the distance between the point C and the intersection E between the original image and the optical axis of the projecting lens PJL1 of the first projector and the distance between the point C and the intersection F between the original image and the optical axis of the projecting lens PJL2 of the second projector is large, and the distance between the point C and the point E and that between the point C and the point F are large.

The image shift between the projection images D1 and D2 at the point D is small, as shown in FIG. 6, because although the difference between the distance between the point D and the intersection E between the original image and the optical axis of the projecting lens PJL1 of the first projector and the distance between the point D and the intersection F between the original image and the optical axis of the projecting lens PJL2 of the second projector is large, the distances from the intersections E and F between the projecting lens optical axes and the liquid crystal panel are small.

As described above, it was found that when superposition projection is done using conventional projecting lenses that do not take superposition projection into consideration, for which the maximum value of the absolute value of distortion is large, and the distortion value largely changes at each part of image height, the image shift especially at the upper portion of the projection screen is obviously noticeable. According to experiments, when the image shift largely exceeds one pixel, the image quality greatly degrades, resulting in a problem in practical use. In this prior art, the image shift corresponds to 2.36 pixels at the points C1 and C2, and 1.83 pixels at the points A1 and A2. This decreases resolution of small characters or the like.

Figure 3:
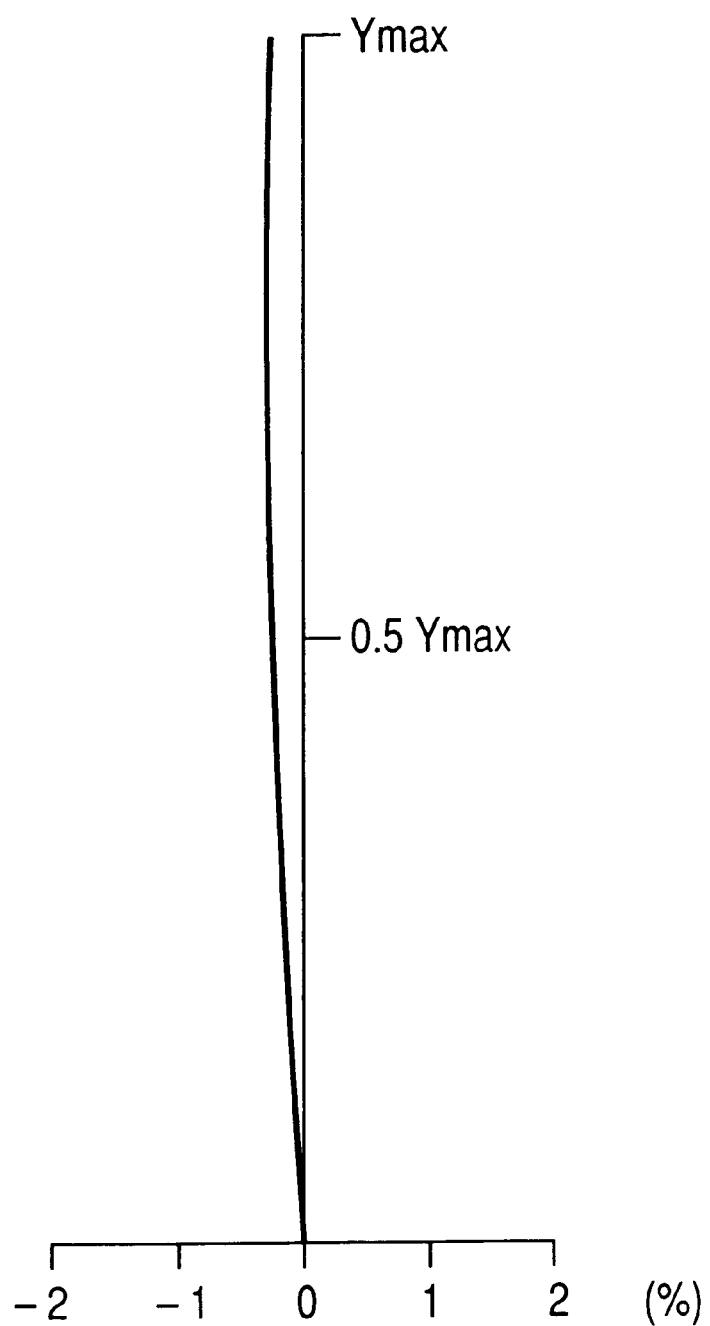
FIG. 3 is a distortion chart in the maximum wide-angle state of a projecting lens according to an embodiment of the present invention.

FIG. 3 is a distortion chart showing distortion in the maximum wide-angle state of a projecting lens according to this embodiment. The absolute value of distortion and partial slope of distortion are small.

Figure 4:
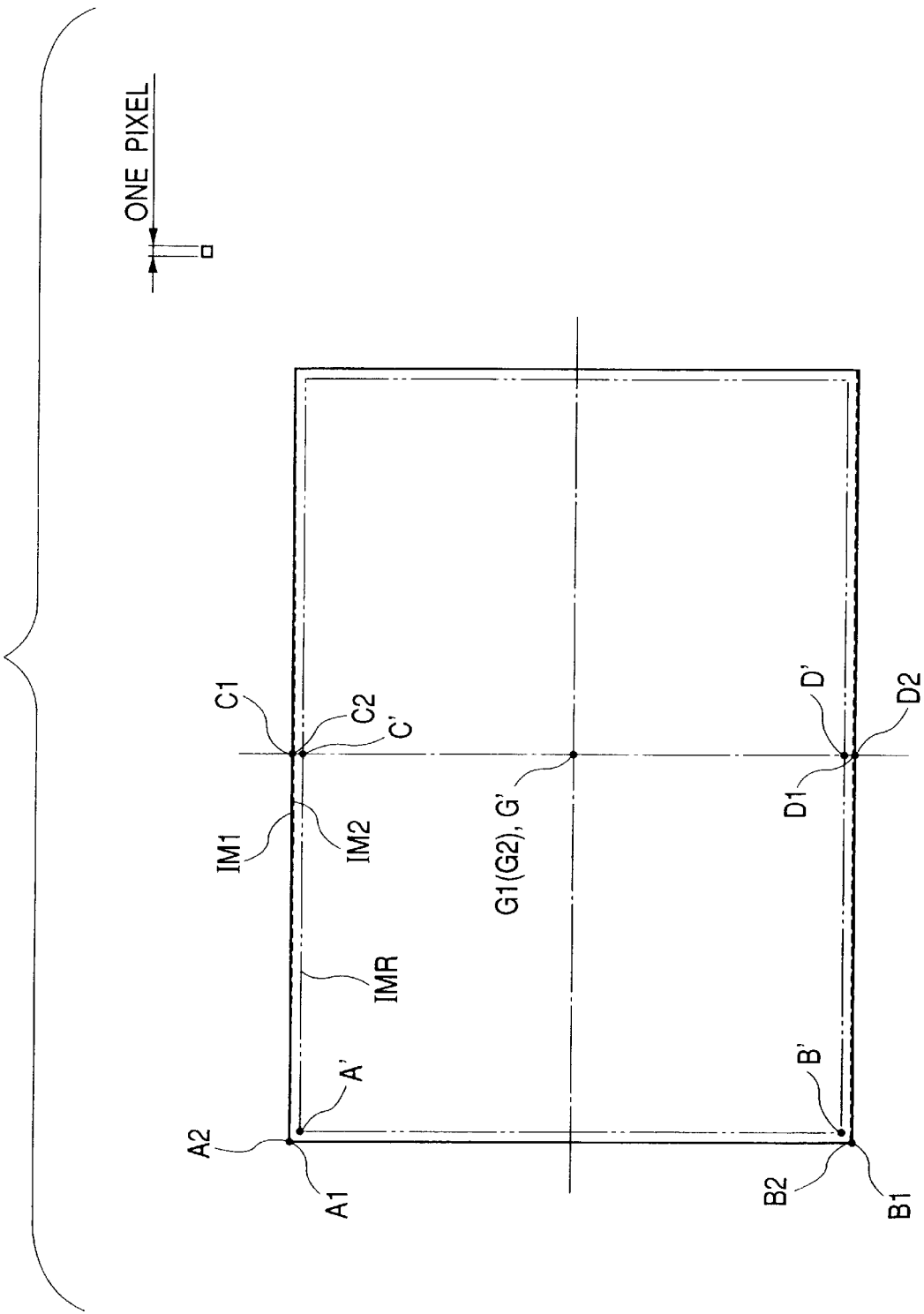
FIG. 4 is a view showing a pixel shift in the maximum wide-angle state of the projecting lens according to the embodiment of the present invention.

When superposition projection shown in FIG. 1 is done using a projecting lens having such distortion, projection images shown in FIG. 4 are obtained on the screen. Referring to FIG. 4, the solid line indicates the shape of projection image by the first projector, and the broken line indicates the shape of projection image by the second projector.

The alternate long and two short dashed line indicates a projection image when distortion is 0. For the illustrative convenience, the image shift is enlarged to about 10 times the actual size.

Referring to FIG. 4, a point A1 corresponds to the point A of the original image shown in FIG. 2, which is projected onto the screen by the first projector. Similarly, points B1, C1, D1, and G1 correspond to the points B, C, D, and G, respectively.

Referring to FIG. 4, a point A2 corresponds to the point A of the original image shown in FIG. 2, which is projected onto the screen by the second projector. Similarly, points B2, C2, D2, and G2 correspond to the points B, C, D, and G, respectively.

When an arrangement in which the maximum value of the absolute value of distortion near the maximum wide-angle state of the projecting lens and the change in distortion value at each part of image height is made small is employed, as in this embodiment, the image shift is small at any point, and the projection images of the two projectors can be almost completely superposed, as shown in FIG. 4.

In decreasing the maximum value of the absolute value of the distortion value near the maximum wide-angle state of the projecting lens and the change in distortion value at each part of image height, when $|K1|<0.25$ (condition (1)) is satisfied where $K1=-((L/\beta/H)*DISmax*0.0258/P$, a more satisfactory result can be obtained.

Condition (1) represents the relationship between a maximum value DISmax of the absolute value of slope of distortion of the projecting lens, the maximum optical axis interval L between the projecting lenses, a projection magnification p of the projecting lens, the short-side length H of the original image, and the pixel pitch P of the original image. In a region beyond the upper limit value of condition (1), the pixel shift largely exceeds one pixel, and resolution undesirably degrades.

The reason why the image height range where the maximum value DISmax of the absolute value of slope of distortion of the projecting lens is selected is 0.25 to 1 when maximum image height is set to 1, (maximum image height=1) is that when the absolute value of slope of distortion is maximized in the image height range of 0 to 0.25, and the value is used for condition (1), correlation to the pixel shift degrades. That is, the influence on pixel shift is small even when the absolute value of slope of distortion is large at an image height as small as 0.25 or less.

Further, when $0.35<|K2|<0.65$ (condition (2)) is satisfied where $K2=S1/H$, a more satisfactory result can be obtained.

Condition (2) limits a ratio K2 of the maximum interval (maximum shift amount) S1 between the projecting lens optical axis and the center of the original image to the short-side length H of the original image. In a region below the lower limit value of condition (2), when the image projection apparatus is installed on the lower side of the center of projection screen, for example, on a desk, the projection area on the lower side of the image projection apparatus undesirably becomes large. In a region exceeding the upper limit value of condition (2), the image circle of the projecting lens must be made large more than necessity, and the projecting lens undesirably becomes large.

The embodiments of the present invention will be described below.

[First Embodiment]

Figure 7:
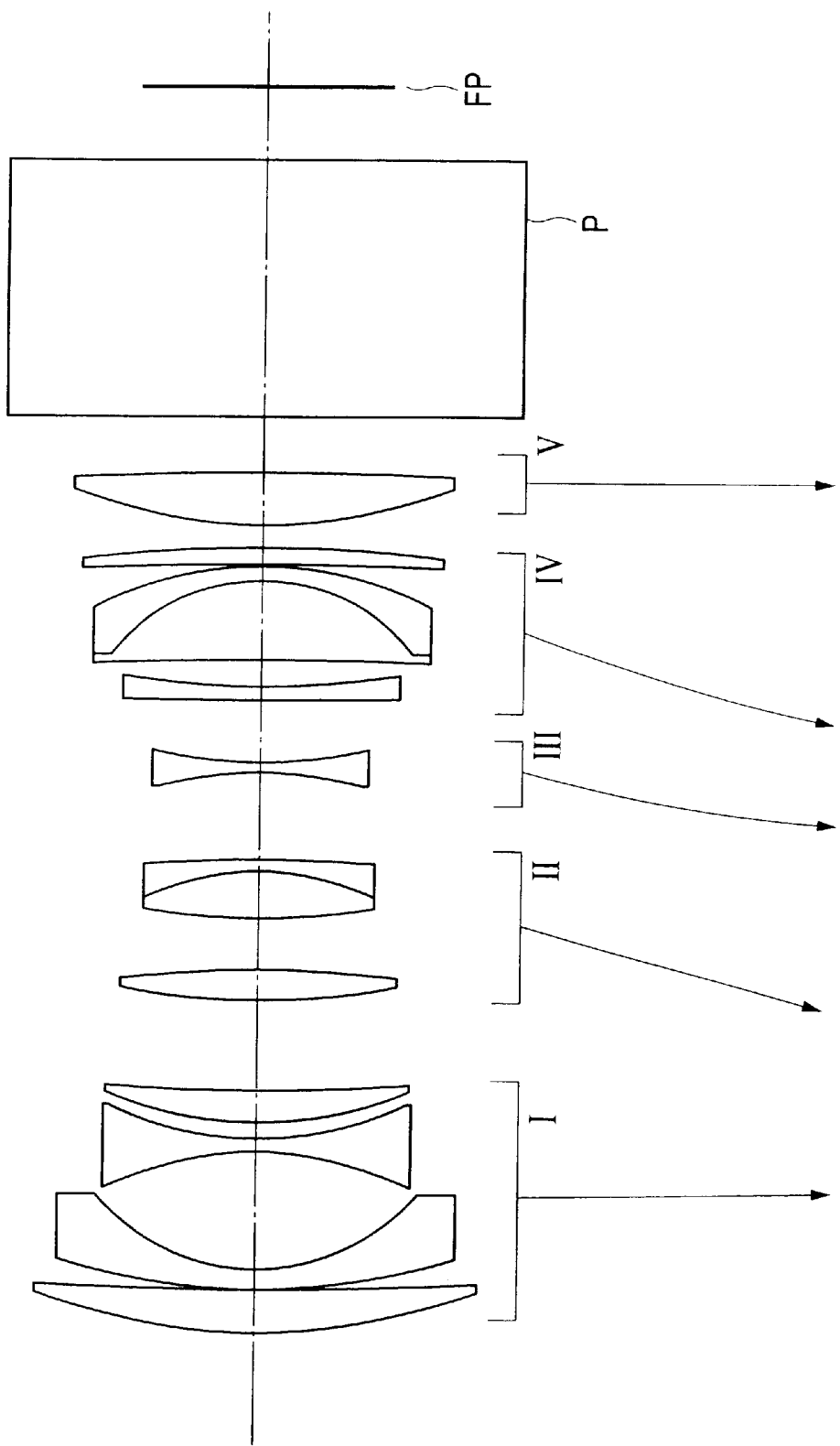
FIG. 7 is a sectional view of a projecting lens according to the first embodiment of the present invention.
Figure 8:
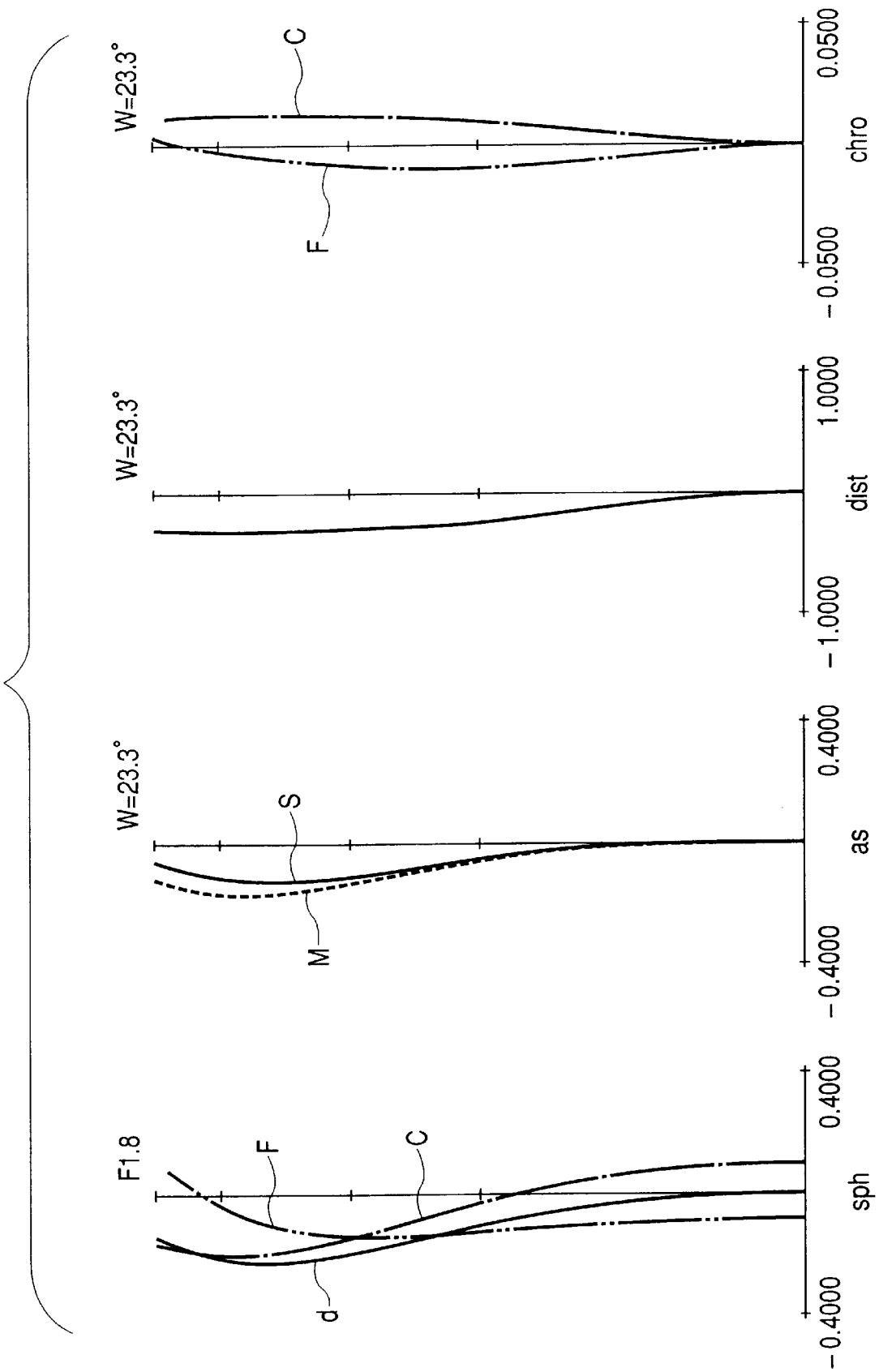
FIG. 8 shows aberration charts at each position from the maximum wide-angle state to the maximum telephoto state in the first embodiment of the present invention.
Figure 9:
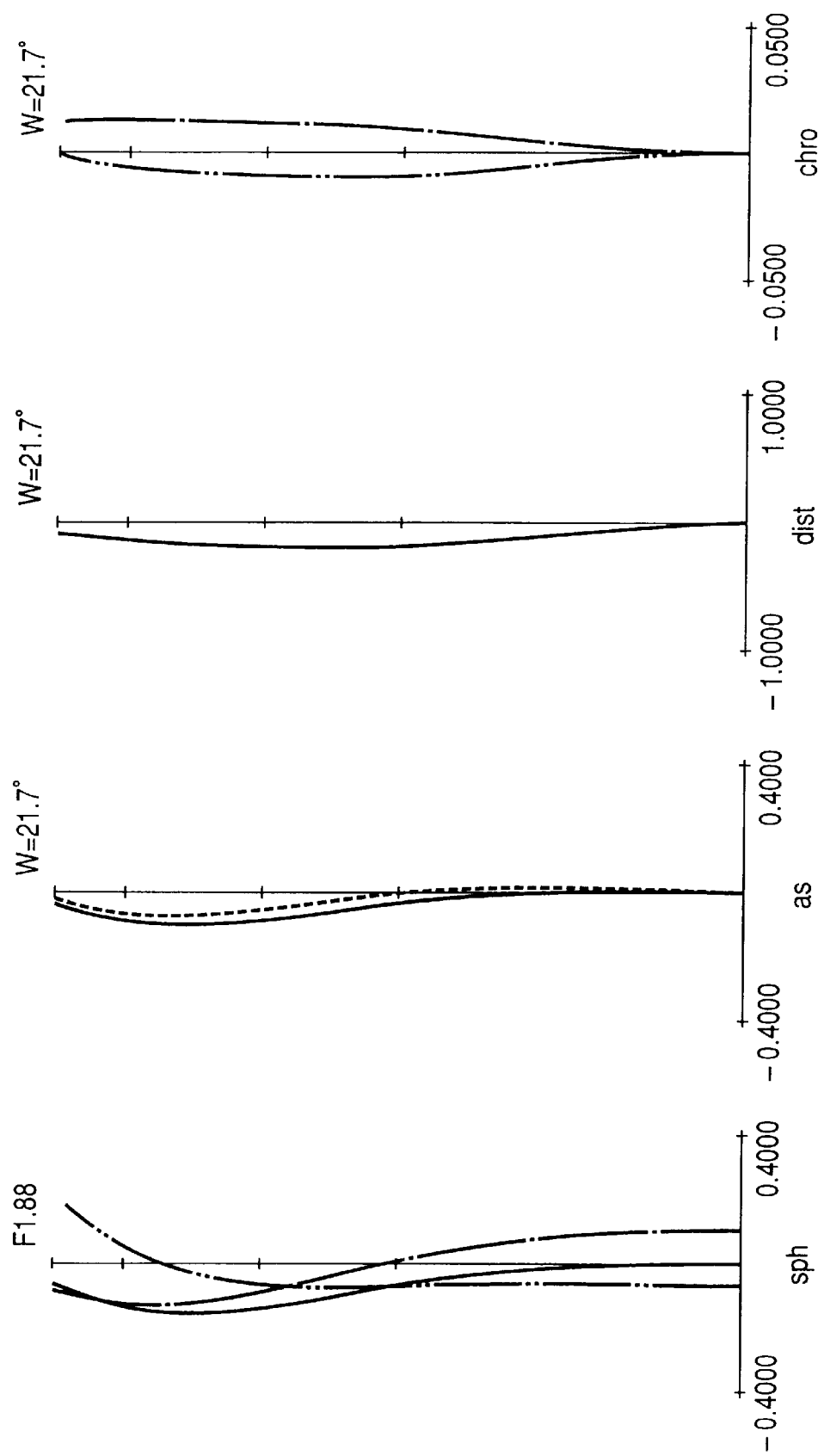
FIG. 9 shows aberration charts at each position from the maximum wide-angle state to the maximum telephoto state in the first embodiment of the present invention.
Figure 10:
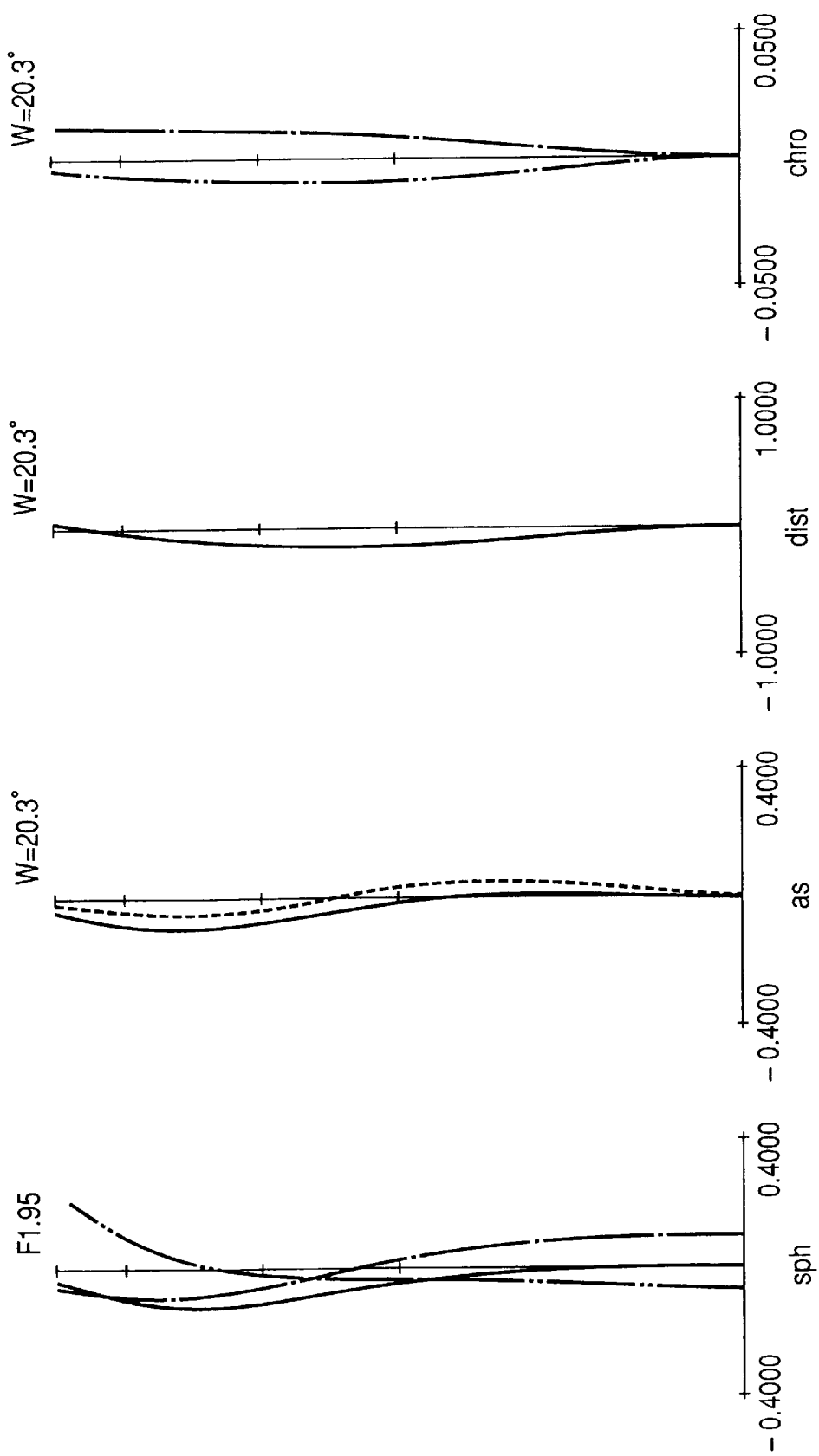
FIG. 10 shows aberration charts at each position from the maximum wide-angle state to the maximum telephoto state in the first embodiment of the present invention.
Figure 11:
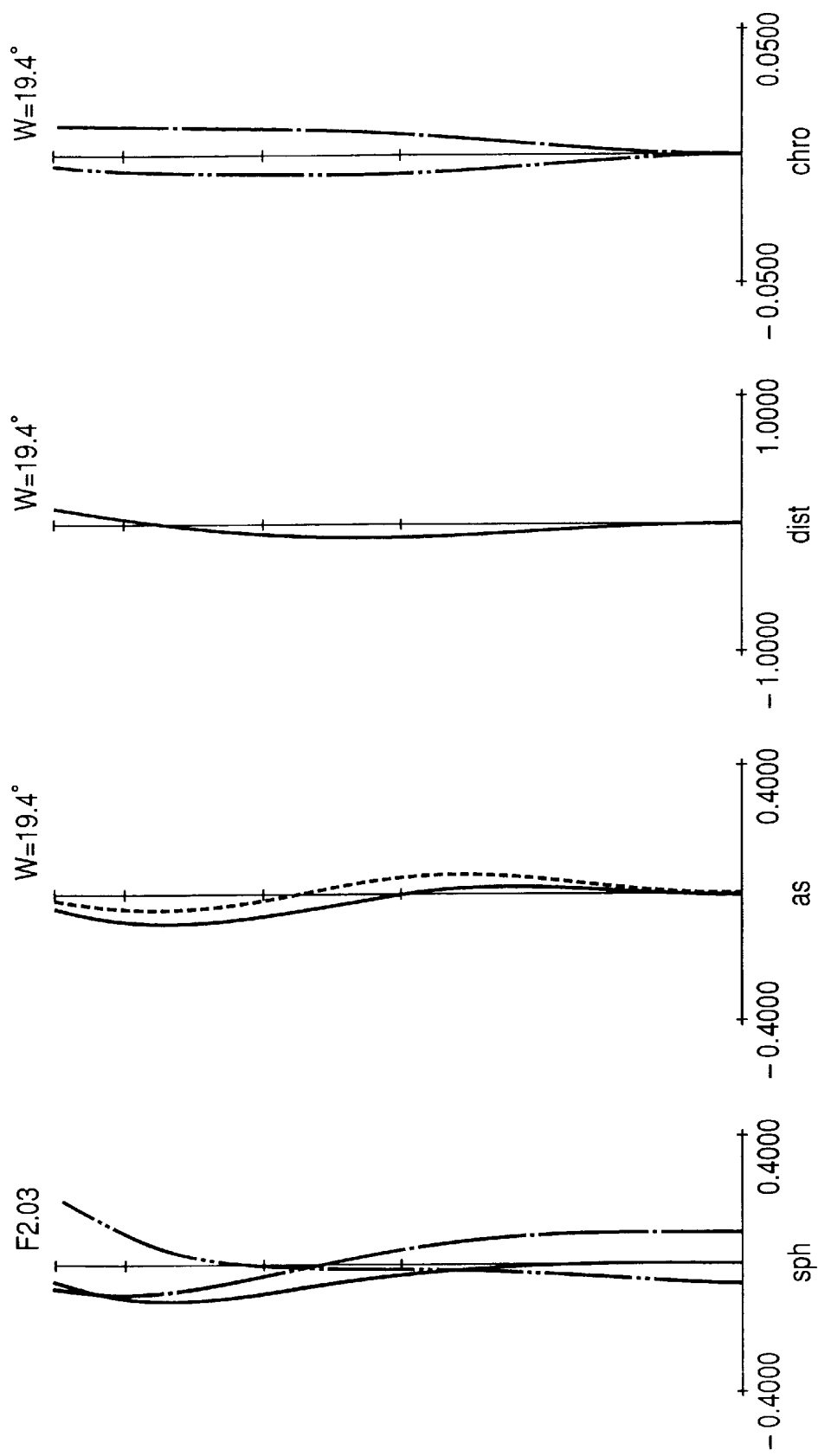
FIG. 11 shows aberration charts at each position from the maximum wide-angle state to the maximum telephoto state in the first embodiment of the present invention.
Figure 12:
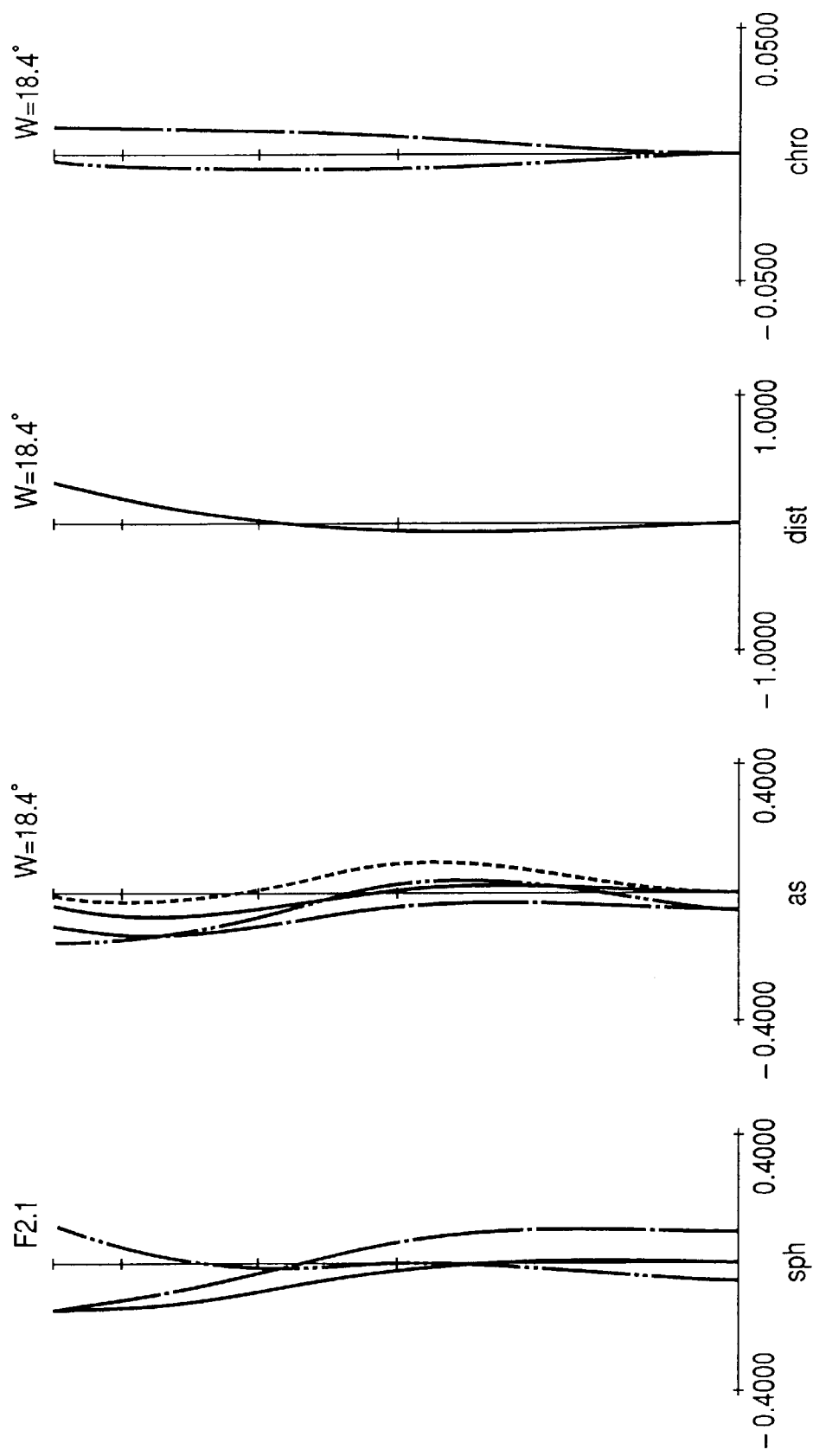
FIG. 12 shows aberration charts at each position from the maximum wide-angle state to the maximum telephoto state in the first embodiment of the present invention.

FIG. 7 is a sectional view of a projecting lens in an image projection apparatus according to the first embodiment of the present invention. In this embodiment, conditions such as the projecting lens magnification and the image source size are defined as follows.

L=200
β=−76.923
H=19.812
W=26.416
S1=9.151
K2=0.462
P=0.0258

As shown in FIG. 7, the projecting lens comprises a first lens unit having negative refracting power, a second lens unit having positive refracting power, a third lens unit having negative refracting power, a fourth lens unit having positive refracting power, and a fifth lens unit having positive refracting power sequentially from the screen side. In changing the focal length, the intervals between the first lens unit and second lens unit, between the second lens unit and the third lens unit between the third lens unit and the fourth lens unit, and between the fourth lens unit and the fifth lens unit are changed to correct the change in focal length and a change in focal point movement according to the change in focal length. More specifically, in changing the focal length, the second, third, and fourth lens unit are moved in the direction of optical axis, and the focal position is adjusted by the first lens unit in accordance with the change in screen distance. An aspherical surface is used as the screen-side surface of a negative lens as the second component from the screen side in the first lens unit thereby suppressing a variation in distortion according to the change in focal length.

The apparatus has a color synthesis prism such as a cross dichroic prism, and a focal plane FP.

FIGS. 8, 9, 10, 11, and 12 show aberration charts when the projection magnification of the projecting lens of this embodiment is −76.923, and the focal lengths are 53.74, 58.36, 62.62, 65.81, and 69.82.

Table 1 shows the distortion values of the projecting lens of this embodiment. Table 2 shows the slope of distortion in each image height range and the values of condition K2.

Table 3 shows image shifts at points of liquid crystal surface under the layout condition of the two projectors of this embodiment, which are converted into a pixel unit.

As described above, in this embodiment, the maximum value of the absolute value of distortion and the slope of partial distortion of image height are made small in the entire variable focal length range whereby the pixel shift in superposition projection can be made small in the entire variable focal length range.

TABLE 1

(Distortion Value)

| Focal Length<br>Image Height | 53.740 | 58.360 | 62.620 | 65.810 | 69.820 |
|---|---|---|---|---|---|
| 0 | 0 | 0 | 0 | 0 | 0 |
| 0.25 | −0.14053 | −0.11638 | −0.08747 | −0.08259 | −0.06251 |
| 0.50 | −0.23572 | −0.18357 | −0.14279 | −0.10586 | −0.05004 |
| 0.70 | −0.28127 | −0.18648 | −0.11871 | −0.05617 | 0.040464 |
| 0.90 | −0.28249 | −0.12623 | −0.02372 | 0.071384 | 0.220986 |
| 1 | −0.25036 | −0.05515 | 0.064304 | 0.17566 | 0.353598 |

(unit: %)

The image height is a value obtained by normalizing the maximum image height to 1. The maximum image height is 23.187.

TABLE 2

(Slope of Distortion Value and Values DISmax and K1 in Each Image Height Range)

| Focal Length<br>Image Height | 53.740 | 58.360 | 62.620 | 65.810 | 69.820 |
|---|---|---|---|---|---|
| 0–0.25 | −0.56212 | −0.46553 | −0.38987 | −0.33038 | −0.25005 |
| 0.25–0.5 | −0.38076 | −0.26874 | −0.18127 | −0.09308 | 0.04988 |
| 0.5–0.7 | −0.22773 | −0.01455 | 0.120385 | 0.24846 | 0.452535 |
| 0.7–0.9 | −0.00614 | 0.30123 | 0.47497 | 0.63778 | 0.90261 |
| 0.9–1 | 0.32129 | 0.71079 | 0.88019 | 1.04276 | 1.32612 |
| DISmax | 0.38076 | 0.71079 | 0.88019 | 1.04276 | 1.32612 |
| K1 | 0.0500 | 0.0933 | 0.1155 | 0.1368 | 0.1740 |

(The maximum value of slope of distortion is the maximum value of the absolute value of slope within the image height range of 0.25 to 1)

TABLE 3

Pixel Shift (One Pixel 0.0258 × 0.0258)

| Focal Length | 53.740 | 58.360 | 62.620 | 65.810 | 69.820 |
|---|---|---|---|---|---|
| A(y) | −0.154 | −0.335 | −0.413 | −0.487 | −0.618 |
| A(z) | 0.261 | 0.617 | 0.778 | 0.931 | 1.191 |
| B(y) | −0.021 | −0.004 | 0.008 | 0.018 | 0.036 |
| B(z) | 0.060 | 0.063 | 0.059 | 0.054 | 0.046 |
| C(y) | 0 | 0 | 0 | 0 | 0 |
| C(z) | −0.022 | 0.252 | 0.410 | 0.556 | 0.787 |
| D(y) | 0 | 0 | 0 | 0 | 0 |
| D(z) | 0.216 | 0.166 | 0.124 | 0.080 | 0.010 |

(unit: pixel)

[Second Embodiment]

Figure 13:
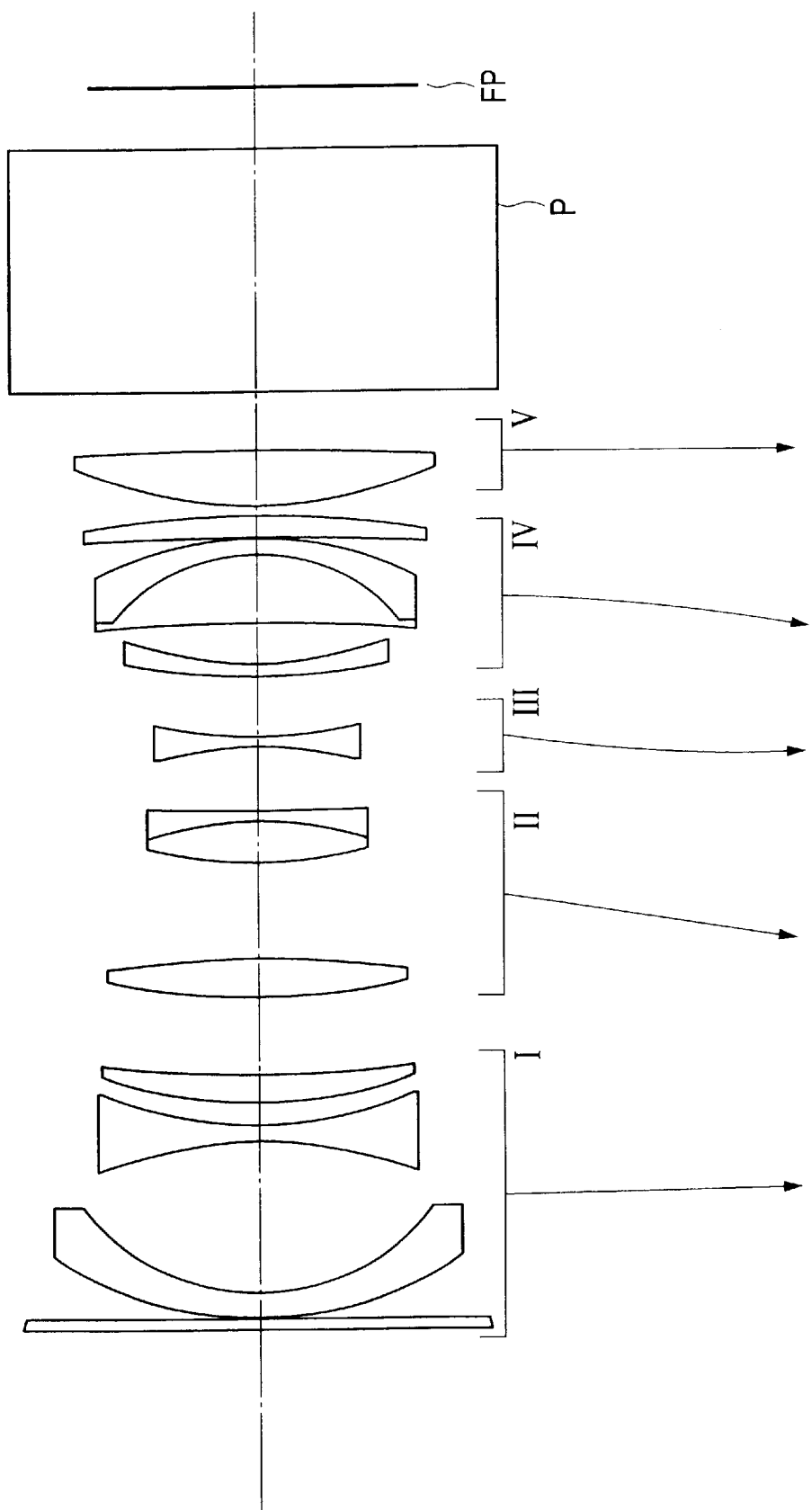
FIG. 13 is a sectional view of a projecting lens according to the second embodiment of the present invention.
Figure 14:
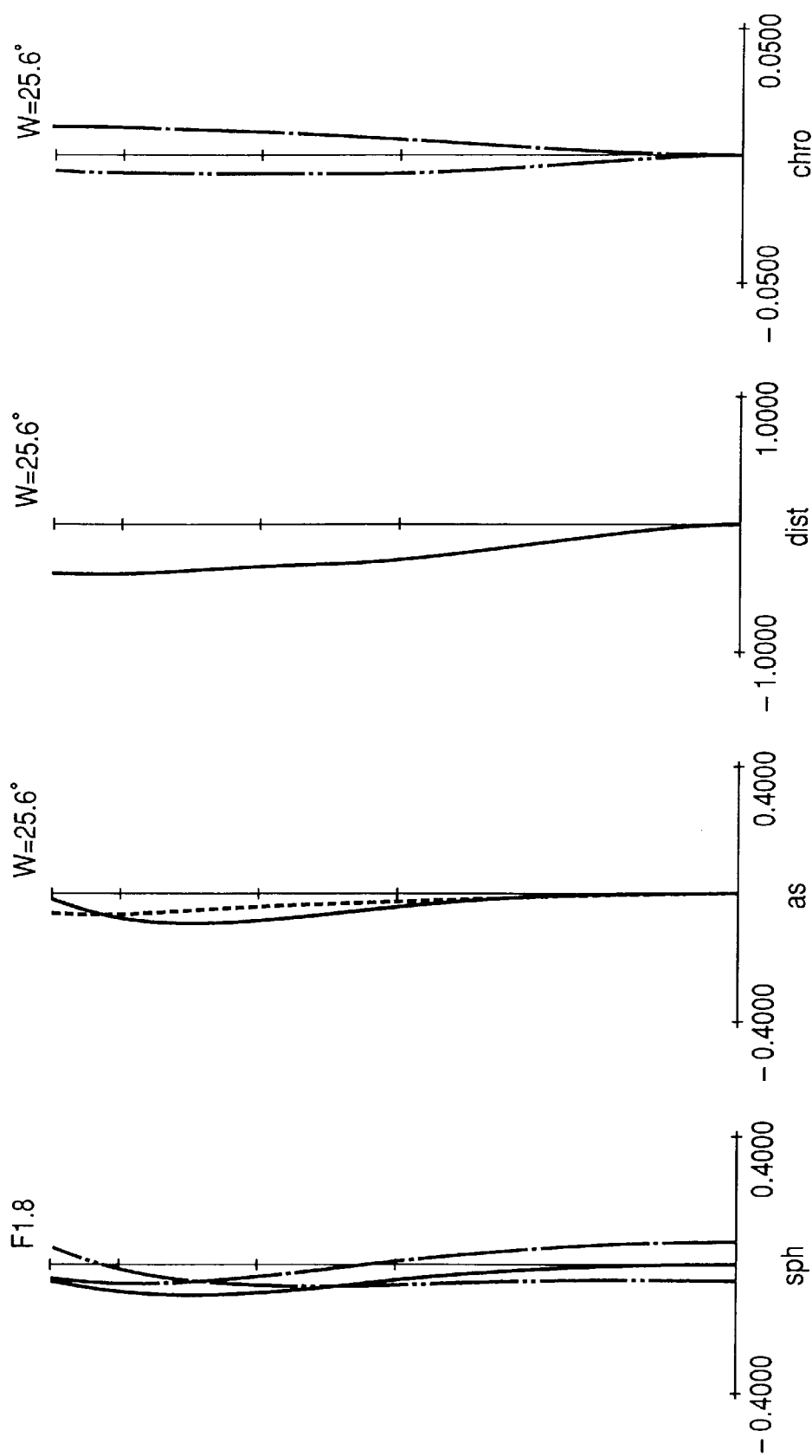
FIG. 14 shows aberration charts at each position from the maximum wide-angle state to the maximum telephoto state in the second embodiment of the present invention.
Figure 15:
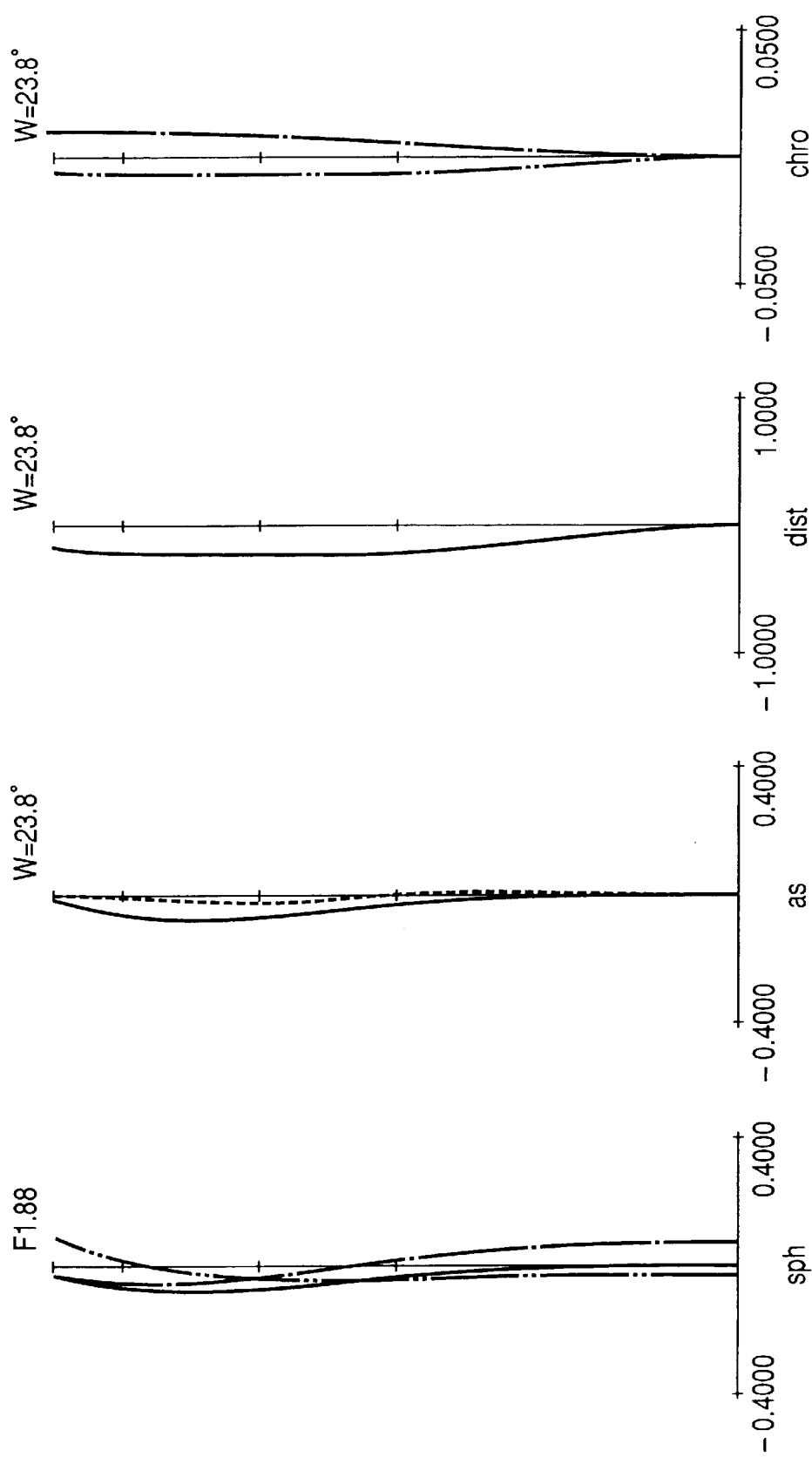
FIG. 15 shows aberration charts at each position from the maximum wide-angle state to the maximum telephoto state in the second embodiment of the present invention.
Figure 16:
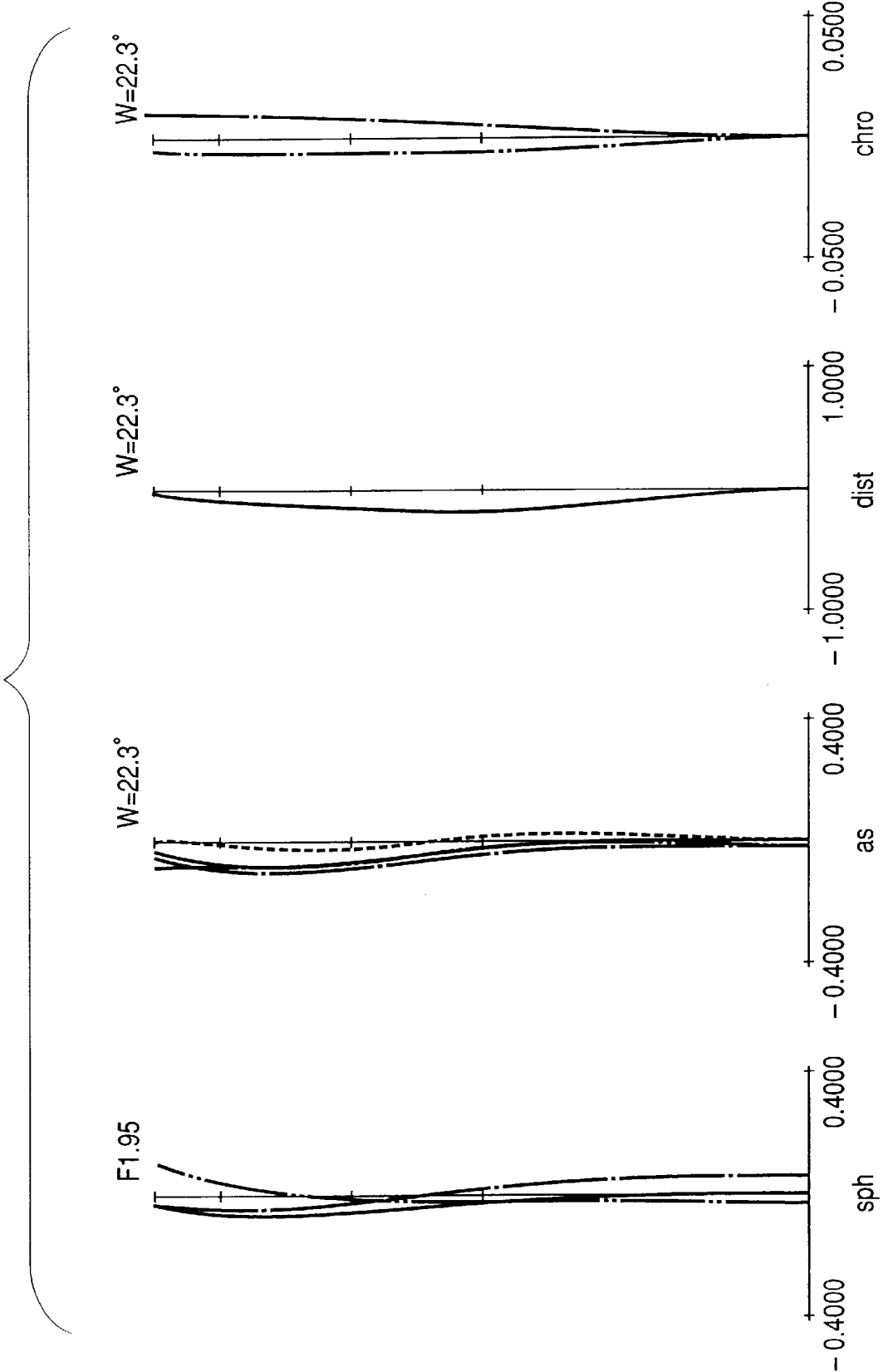
FIG. 16 shows aberration charts at each position from the maximum wide-angle state to the maximum telephoto state in the second embodiment of the present invention.
Figure 17:
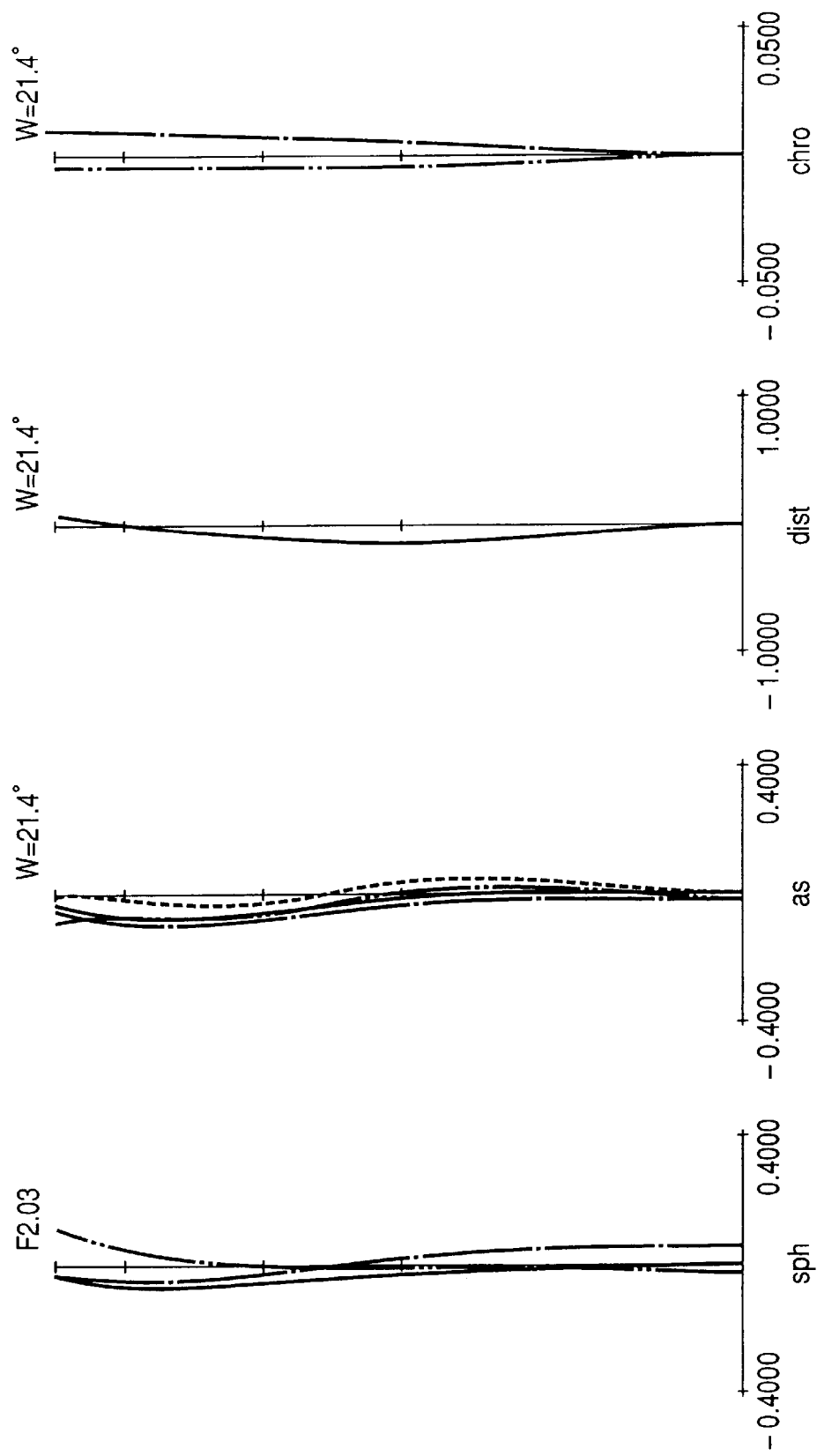
FIG. 17 shows aberration charts at each position from the maximum wide-angle state to the maximum telephoto state in the second embodiment of the present invention.
Figure 18:
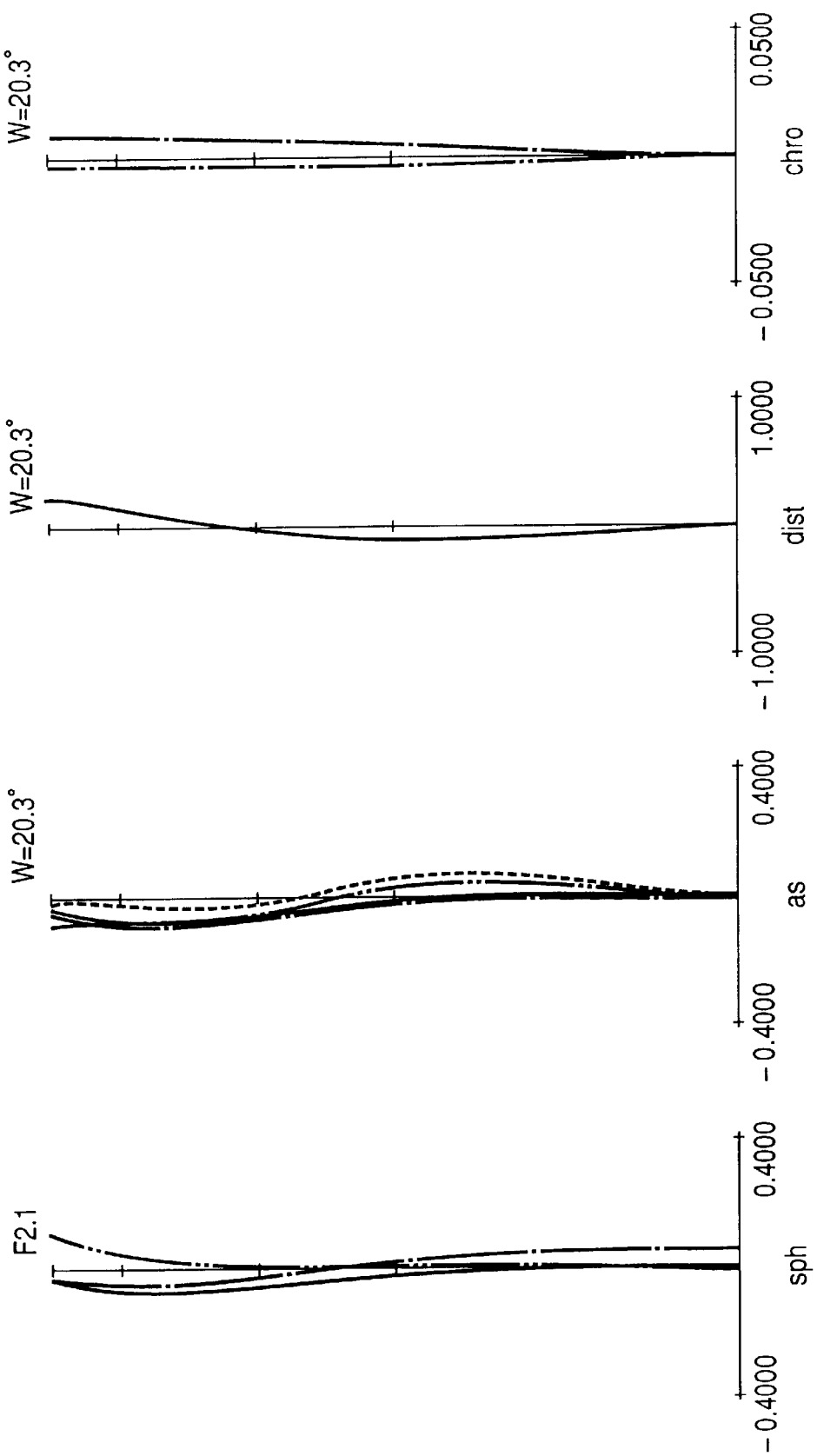
FIG. 18 shows aberration charts at each position from the maximum wide-angle state to the maximum telephoto state in the second embodiment of the present invention.

FIG. 13 is a sectional view of a projecting lens in an image projection apparatus according to the second embodiment of the present invention. In this embodiment, conditions such as the projecting lens magnification and the image source size are defined as follows.

L=120
β=−111.111
H=13.716
W=18.288
S1=6.306
K2=0.460
P=0.0179

As shown in FIG. 13, the projecting lens comprises a first lens unit having negative refracting power, a second lens unit having positive refracting power, a third lens unit having negative refracting power, a fourth lens unit having positive refracting power, and a fifth lens unit having positive refracting power sequentially from the screen side. In changing the focal length, the intervals between the first lens unit and second lens unit, between the second lens unit and the third lens unit, between the third lens unit and the fourth lens unit, and between the fourth lens unit and the fifth lens unit are changed to correct the change in focal length and a change in focal point movement according to the change in focal length. More specifically, in changing the focal length, the second, third, and fourth lens units are moved in the direction of optical axis, and the focal position is adjusted by the first lens unit in accordance with the change in screen distance. An aspherical surface is used as the screen-side surface of a negative lens as the second component from the screen side in the first lens unit, thereby suppressing a variation in distortion according to the change in focal length. The first component is a non-power glass cover which is arranged to prevent damage to the second aspherical lens.

The apparatus has a color synthesis prism such as a cross dichroic prism, and a focal plane FP.

FIGS. 14, 15, 16, 17, and 18 show aberration charts when the projection magnification of the projecting lens of this embodiment is −111.111, and the focal lengths are 33.53, 36.42, 39.05, 41.01, and 43.47.

Table 4 shows the distortion values of the projecting lens of this embodiment. Table 5 shows the slopes of distortion in each image height range and the values of condition K1.

Table 6 shows image shifts at points of liquid crystal surface under the layout condition of the two projectors of this embodiment, which are converted into a pixel unit.

As described above, in this embodiment, since the original image size is reduced, the entire projection apparatus can be made compact, as compared to the first embodiment. In addition, since the projecting lens optical axis interval L can be reduced, the pixel shift in superposition projection can be further decreased in the entire variable focal length range.

TABLE 4

(Distortion Value)

| Focal Length<br>Image Height | 33.530 | 36.420 | 39.050 | 41.010 | 43.470 |
| --- | --- | --- | --- | --- | --- |
| 0 | 0 | 0 | 0 | 0 | 0 |
| 0.25 | −0.17896 | −0.1490 | −0.12615 | −0.11112 | −0.09203 |
| 0.50 | −0.28232 | −0.22438 | −0.18365 | −0.15088 | −0.10447 |
| 0.70 | −0.33739 | −0.22075 | −0.14793 | −0.09228 | −0.01456 |
| 0.90 | −0.37977 | −0.18587 | −0.07193 | 0.01555 | 0.13849 |
| 1 | −0.36776 | −0.13434 | −0.00686 | 0.09214 | 0.235373 |

(unit: %)

The image height is a value obtained by normalizing the maximum image height to 1. The maximum image height is 16.028.

TABLE 5

(Slope of Distortion Value and Values DISmax and K1 in Each Image Height Range)

| Focal Length<br>Image Height | 33.530 | 36.420 | 39.050 | 41.010 | 43.470 |
| --- | --- | --- | --- | --- | --- |
| 0–0.25 | −0.71582 | −0.59601 | −0.50460 | −0.44446 | −0.36811 |
| 0.25–0.5 | −0.41347 | −0.30153 | −0.23000 | −0.15906 | −0.04976 |
| 0.5–0.7 | −0.27534 | 0.01818 | 0.17858 | 0.29299 | 0.44953 |
| 0.7–0.9 | −0.21191 | 0.17438 | 0.38000 | 0.53914 | 0.76526 |
| 0.9–1 | 0.12008 | 0.5153 | 0.65069 | 0.76594 | 0.96883 |
| DISmax | 0.41347 | 0.5153 | 0.65069 | 0.76594 | 0.96883 |
| K1 | 0.0470 | 0.0585 | 0.0738 | 0.0869 | 0.1100 |

(The maximum value of slope of distortion is the maximum value of the absolute value of slope within the image height range of 0.25 to 1)

TABLE 6

Pixel Shift (One Pixel 0.0179 × 0.0179)

| Focal Length | 33.530 | 36.420 | 39.050 | 41.010 | 43.470 |
| --- | --- | --- | --- | --- | --- |
| A(y) | −0.049 | −0.162 | −0.196 | −0.226 | −0.279 |
| A(z) | 0.077 | 0.323 | 0.413 | 0.443 | 0.602 |
| B(y) | −0.011 | 0 | 0.006 | 0.011 | 0.017 |
| B(z) | 0.052 | 0.054 | 0.054 | 0.009 | 0.046 |
| C(y) | 0 | 0 | 0 | 0 | 0 |
| C(z) | −0.103 | 0.127 | 0.256 | 0.307 | 0.475 |
| D(y) | 0 | 0 | 0 | 0 | 0 |
| D(z) | 0.178 | 0.142 | 0.116 | 0.051 | 0.057 |

(unit: pixel)

Figure 19:
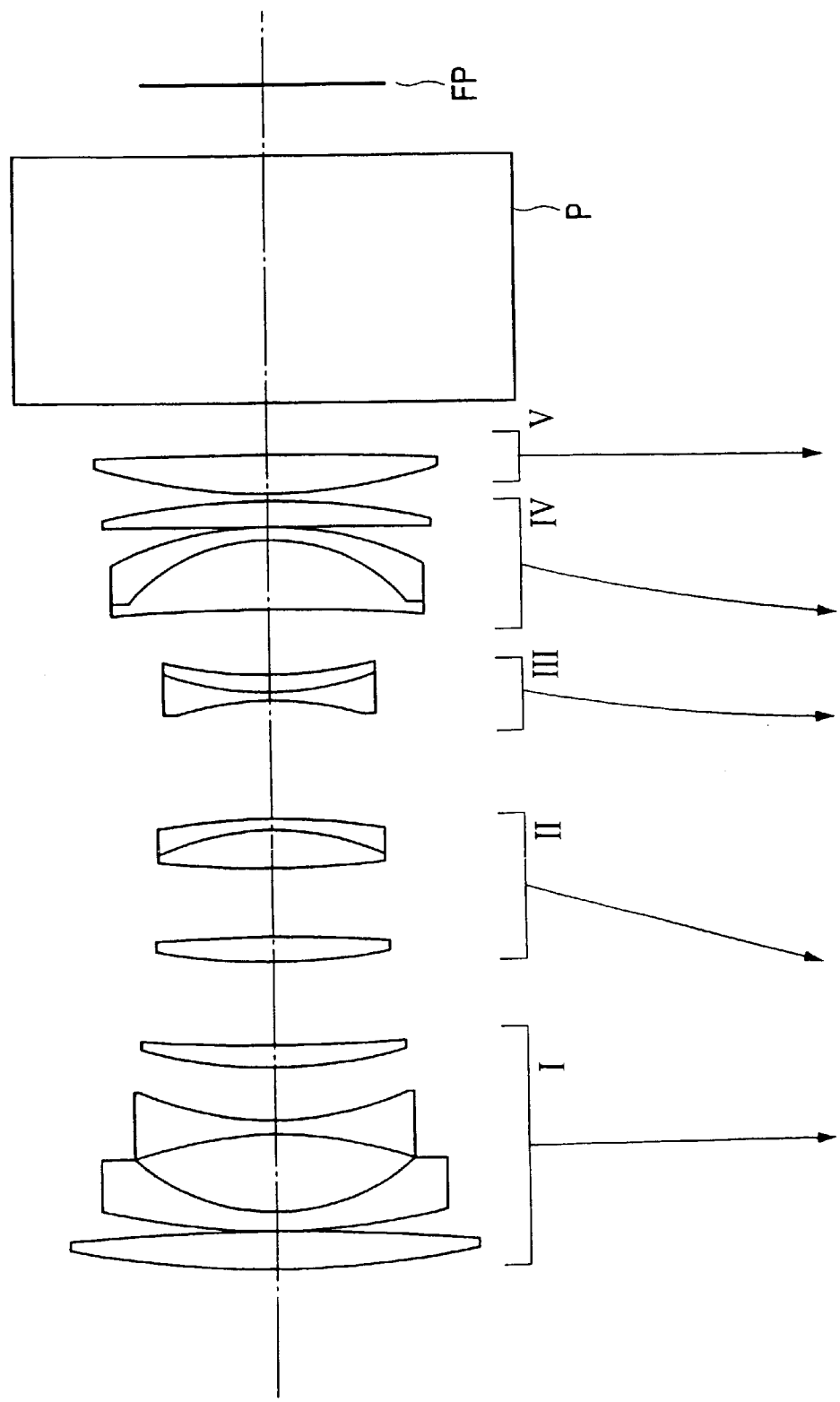
FIG. 19 is a sectional view of a projecting lens according to a prior art.
Figure 20:
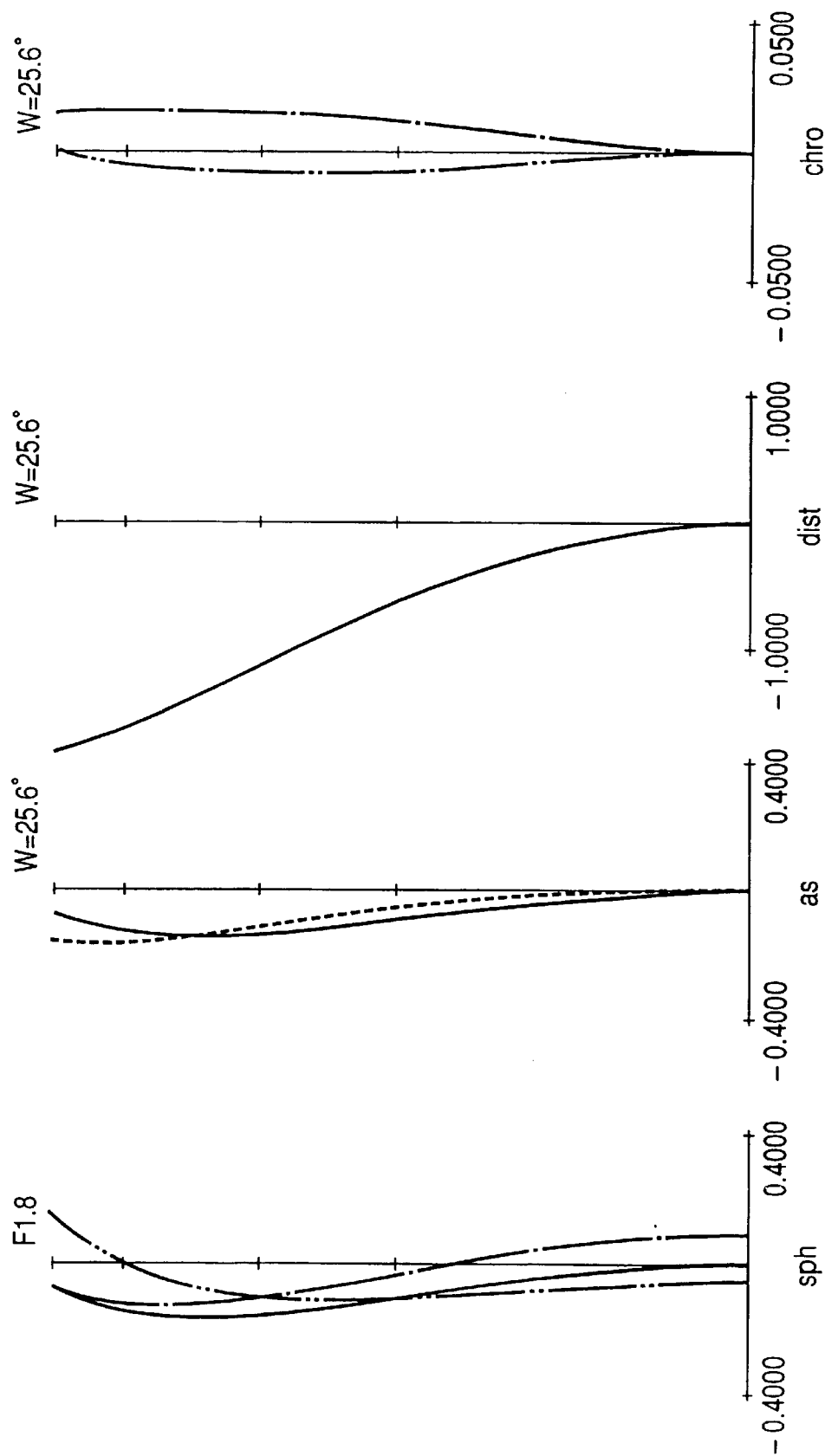
FIG. 20 shows aberration charts at each position from the maximum wide-angle state to the maximum telephoto state in the prior art.
Figure 21:
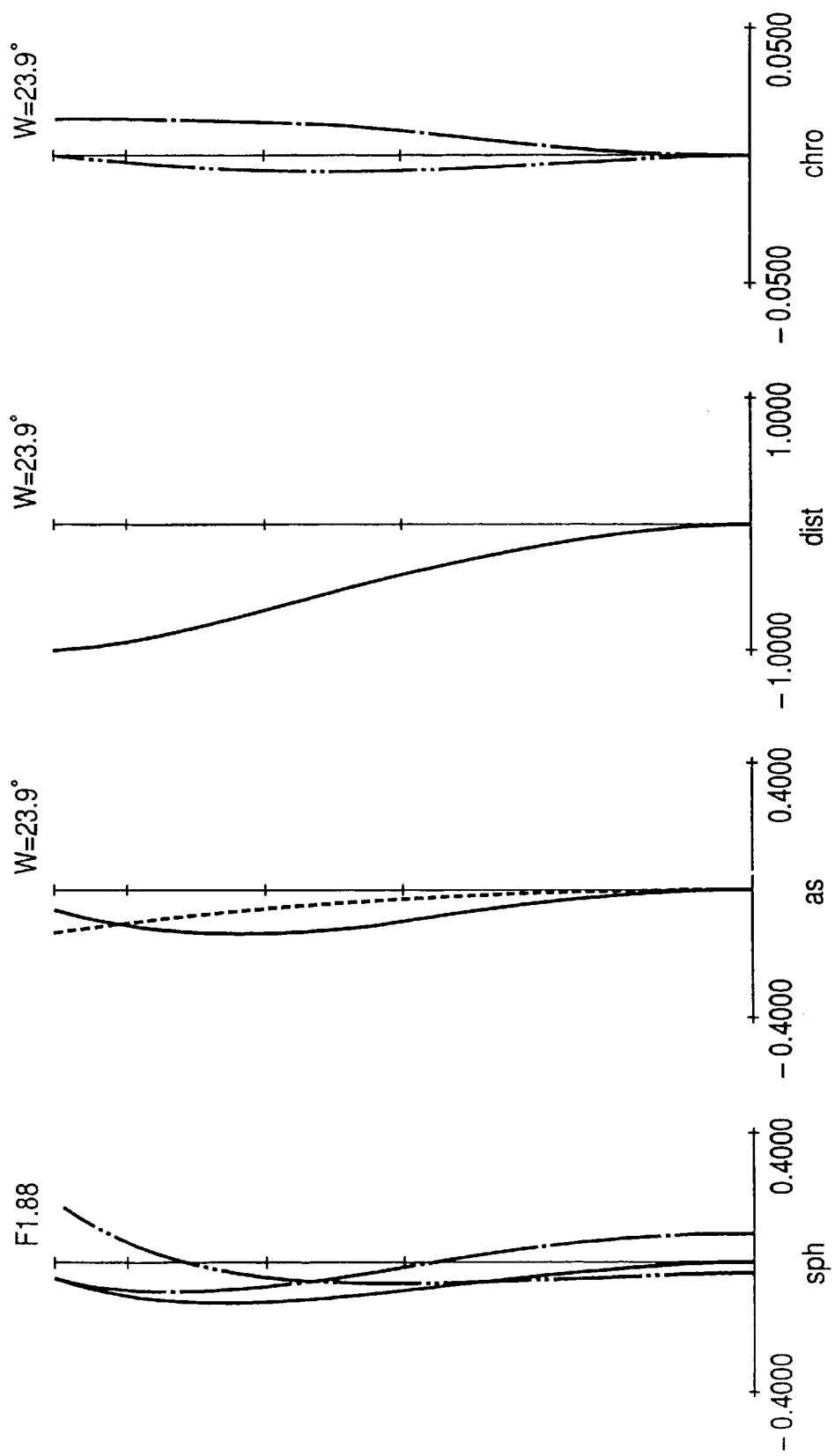
FIG. 21 shows aberration charts at each position from the maximum wide-angle state to the maximum telephoto state in the prior art.
Figure 22:
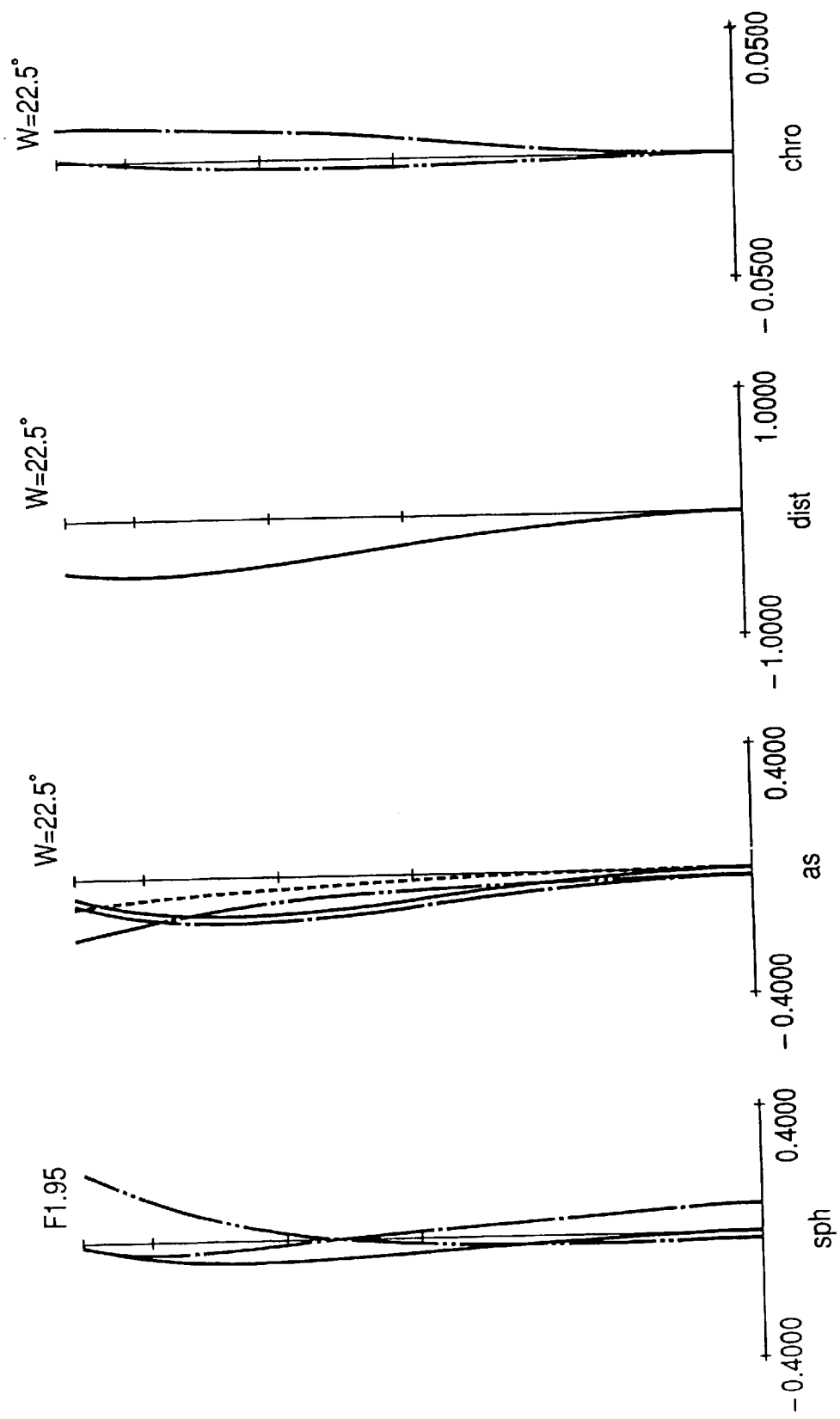
FIG. 22 shows aberration charts at each position from the maximum wide-angle state to the maximum telephoto state in the prior art.
Figure 23:
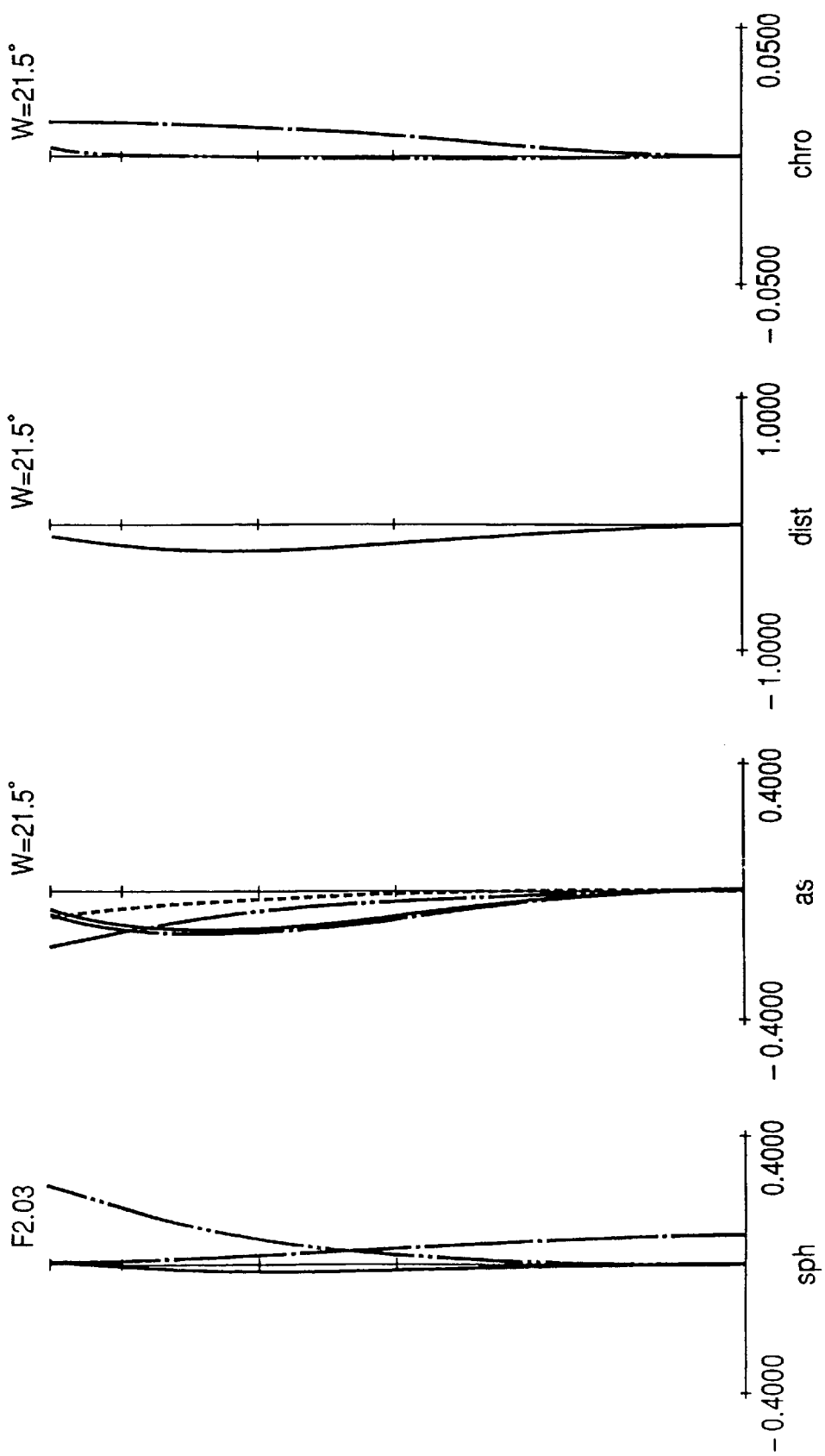
FIG. 23 shows aberration charts at each position from the maximum wide-angle state to the maximum telephoto state in the prior art.
Figure 24:
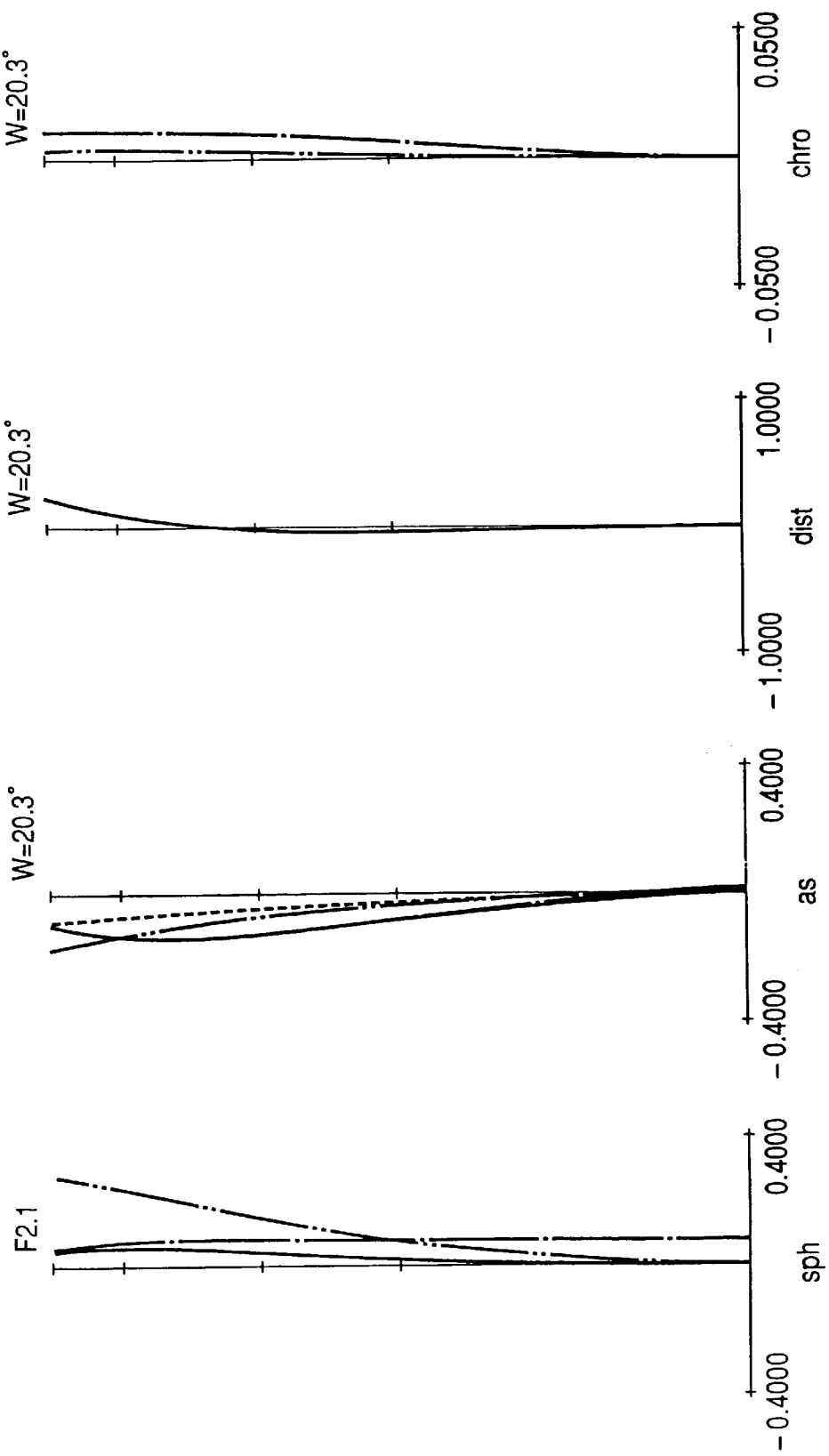
FIG. 24 shows aberration charts at each position from the maximum wide-angle state to the maximum telephoto state in the prior art.

To clarify the difference between each embodiment and prior art, FIG. 19 shows a sectional view of a conventional projecting lens. In the prior art, conditions such as the projecting lens magnification and the image source size are defined as follows.

L=200
β=−76.923
H=19.812
W=26.416
S1=9.151
K2=0.462
P=0.0258

As shown in FIG. 19, the projecting lens of the prior art comprises a first lens unit having negative refracting power, a second lens unit having positive refracting power, a third lens unit having negative refracting power, a fourth lens unit having positive refracting power, and a fifth lens unit having positive refracting power sequentially from the screen side. In changing the focal length, the intervals between the first lens unit and second lens unit, between the second lens unit and the third lens unit, between the third lens unit and the fourth lens unit, and between the fourth lens unit and the fifth lens unit are changed to correct the change in focal length and a change in focal point movement according to the change in focal length. More specifically, in changing the focal length, the second, third, and fourth lens units are moved in the direction of optical axis, and the focal position is adjusted by the first lens unit in accordance with the change in screen distance. All lenses have spherical surfaces.

The apparatus has a color synthesis prism such as a cross dichroic prism, and a focal plane FP.

FIGS. 20, 21, 22, 23, and 24 show aberration charts when the projection magnification of the projecting lens of this embodiment is −76.923, and the focal lengths are 48.43, 52.36, 56.09, 58.98, and 62.79.

Figure 25:
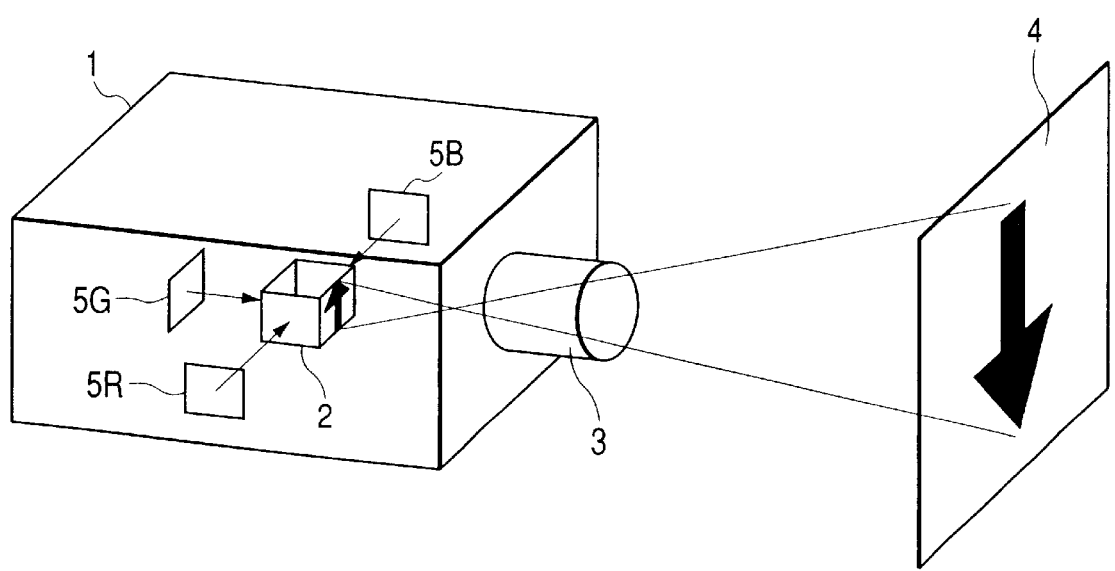
FIG. 25 is a schematic view showing the main part of an image projection apparatus of the present invention.

FIG. 25 is a schematic view showing the main part of an image projection apparatus according to an embodiment of the present invention. FIG. 25 shows an image projection apparatus in which the above-described projecting lens (projection optical system) is applied to a 3-CCD color liquid crystal projector, image information of a plurality of color light components based on a plurality of liquid crystal display elements are synthesized through a color synthesis means and enlarged and projected onto the screen surface through the projecting lens. Referring to FIG. 25, in a color liquid crystal projector 1, R, G, and B light components from three, R, G, and B liquid crystal panels 5R, 5G, and 5B are synthesized into one optical path by a prism 2 serving as a color synthesis means and projected onto a screen 4 using the above-described projecting lens 3.

Table 7 shows the distortion values of the projecting lens of the prior art. Table 8 shows the slopes of distortion in each image height range and the values of condition K1. Table 9 shows image shifts at points of liquid crystal surface under the layout condition of the two projectors of the prior art, which are converted into a pixel unit.

As described above, in the prior art, since the maximum value of the absolute value of slope and the slope of partial distortion of image height are large near the maximum wide-angle state, the pixel shift in superposition projection is considerably large as compared to the above embodiments of the present invention.

TABLE 7

(Distortion Value)

| Focal Length<br>Image Height | 48.430 | 52.360 | 56.090 | 58.980 | 62.790 |
|---|---|---|---|---|---|
| 0.25 | −0.17078 | −0.10983 | −0.06725 | −0.04196 | −0.01648 |
| 0.50 | −0.63938 | −0.40199 | −0.23655 | −0.13840 | −0.03938 |
| 0.70 | −1.14806 | −0.69657 | −0.38339 | −0.19837 | −0.01230 |
| 0.90 | −1.63249 | −0.92973 | −0.44411 | −0.15877 | 0.12658 |
|  | −1.79943 | −0.97425 | −0.40249 | −0.06707 | 0.26741 |

(unit: %)

The image height is a value obtained by normalizing the maximum image height to 1. The maximum image height is 23.187.

TABLE 8

(Slope of Distortion Value and Values DISmax and K1 in Each Image Height Range)

| Focal Length<br>Image Height | 48.430 | 52.360 | 56.090 | 58.980 | 62.790 |
|---|---|---|---|---|---|
| 0–0.25 | −0.68312 | −0.43933 | −0.26900 | −0.16782 | −0.06591 |
| 0.25–0.5 | −1.87439 | −1.16862 | −0.67720 | −0.38577 | −0.09160 |
| 0.5–0.7 | −2.54343 | −1.47290 | −0.73418 | −0.29986 | 0.135395 |
| 0.7–0.9 | −2.42212 | −1.16583 | −0.30362 | 0.19798 | 0.69440 |
| 0.9–1 | −1.66941 | −0.44520 | 0.41619 | 0.91709 | 1.40830 |
| DISmax | 2.54343 | 1.47290 | 0.73418 | 0.91709 | 1.40830 |
| K1 | 0.33378 | 0.19330 | 0.09635 | 0.12035 | 0.184882 |

(The maximum value of slope of distortion is the maximum value of the absolute value of slope within the image height range of 0.25 to 1)

TABLE 9

Pixel Shift (One Pixel 0.0258 × 0.0258)

| Focal Length | 48.430 | 52.360 | 56.090 | 58.980 | 62.790 |
|---|---|---|---|---|---|
| A(y) | 0.751 | 0.190 | −0.206 | −0.436 | −0.662 |
| A(z) | −1.834 | −0.639 | 0.196 | 0.681 | 1.158 |
| B(y) | −0.221 | −0.130 | −0.067 | −0.030 | 0.008 |
| B(z) | 0.039 | 0.036 | 0.033 | 0.031 | 0.028 |
| C(y) | 0 | 0 | 0 | 0 | 0 |
| C(z) | −2.364 | −1.203 | −0.407 | 0.056 | 0.516 |
| D(y) | 0 | 0 | 0 | 0 | 0 |
| D(z) | 0.840 | 0.530 | 0.315 | 0.186 | 0.057 |

(unit: pixel)

Numerical example 1 of the projecting lens according to the first embodiment is shown in Table 10-1 to Table 10-3, numerical example 2 of the second embodiment is shown in Table 11-1 to Table 11-3, and numerical example of the prior art is shown in Table 12-1 to Table 12-2.

In these numerical examples, ri is the radius of curvature of the ith lens surface from the screen side, di is the surface interval of the ith lens surface from the screen side, ni is the refractive index of the ith lens from the screen side for the d line, and vi is the Abbe's number of the ith lens from the screen side.

An aspherical surface shape is represented by $$X = (1/R)*Y^2/(1+\sqrt{(1-(1+K)*(1/R)^2*Y^2)}) + B*Y^4 + C*Y^6 + D*Y^8 + E*Y^{10} + F*Y^{12} + A'*Y^3 + B'*Y^5 + C'*Y^7$$

where R is the paraxial radius of curvature, K is the conic constant, and B, C, D, E, F, A', B', and C' are 4th-, 6th-, 8th-, 10th-, 12th-, 3rd-, 5th-, and 7th-order aspherical coefficients, respectively.

TABLE 10-1

Numerical Example 1
f = 53.73950 to 69.82   fno = 1:1.8 to 2.1   2ω = 46.6° to 36.8°

| r1 = 103.418 | d1 = 7.70 | n1 = 1.66672 | v1 = 48.3 |
|---|---|---|---|
| r2 = 618.272 | d2 = 0.20 | | |
| r3 = 127.652 | d3 = 3.30 | n2 = 1.49171 | v2 = 57.4 |
| r4 = 34.874 | d4 = 20.85 | | |
| r5 = −60.242 | d5 = 2.60 | n3 = 1.51633 | v3 = 64.1 |
| r6 = 60.241 | d6 = 2.65 | | |
| r7 = 67.226 | d7 = 5.65 | n4 = 1.83400 | v4 = 37.2 |
| r8 = 317.496 | d8 = Variable | | |
| r9 = 119.270 | d9 = 5.40 | n5 = 1.78590 | v5 = 44.2 |
| r10 = −182.799 | d10 = 9.05 | | |
| r11 = 111.009 | d11 = 8.45 | n6 = 1.78590 | v6 = 44.2 |
| r12 = −44.894 | d12 = 1.80 | n7 = 1.84666 | v7 = 23.8 |
| r13 = −312.060 stop | d13 = Variable | | |
| r14 = −63.074 | d14 = 1.70 | n8 = 1.51633 | v8 = 64.1 |
| r15 = 80.273 | d15 = Variable | | |
| r16 = 6902.827 | d16 = 2.30 | n9 = 1.51742 | v9 = 52.4 |
| r17 = 145.483 | d17 = 4.40 | | |
| r18 = −522.549 | d18 = 14.50 | n10 = 1.72000 | v10 = 50.2 |
| r19 = −31.435 | d19 = 2.60 | n11 = 1.80518 | v11 = 25.4 |
| r20 = −59.588 | d20 = 0.20 | | |
| r21 = −2252.485 | d21 = 3.30 | n12 = 1.71300 | v12 = 53.9 |
| r22 = −232.559 | d22 = Variable | | |
| r23 = 92.284 | d23 = 9.25 | n13 = 1.71300 | v13 = 53.9 |
| r24 = −513.828 | d24 = 9.90 | | |
| r25 = ∞ | d25 = 45.00 | n14 = 1.51633 | v14 = 64.1 |
| r26 = ∞ | | | |

TABLE 10-2

| Focal Length<br>Variable<br>Distance | 53.74 | 58.36 | 62.62 | 65.81 | 69.82 |
|---|---|---|---|---|---|
| d8 | 15.94 | 10.74 | 6.71 | 4.07 | 1.10 |
| d13 | 15.53 | 16.95 | 18.50 | 19.87 | 21.87 |
| d15 | 11.17 | 9.56 | 7.81 | 6.51 | 4.96 |
| d22 | 4.04 | 9.43 | 13.66 | 16.23 | 18.76 |

TABLE 10-3

| no | type | 1 | 2 | 3 | 4 | 5 | 6 |
|---|---|---|---|---|---|---|---|
| | | r | k | B | C | D | E |
| asph | 3 | q 1.27652D+02 | 1.95682D+00 | 5.50527D−07 | −1.98030D−09 | −3.81162D−13 | −1.30831D−16 |
| | | A' | B' | C' | D' | E' | |
| | | −3.69530D−06 | 2.47904D−08 | 5.29632D−11 | 0.00000D+00 | 0.00000D+00 | |
| | | F | G | H | | | |
| | | 4.83595D−20 | 0.00000D+00 | 0.00000D+00 | | | |
| | | F' | G' | | | | |
| | | 0.00000D+00 | 0.00000D+00 | | | | |

TABLE 11-1

Numerical Example 2
f = 33.53121 to 43.47    fno = 1:1.8 to 2.1    2ω = 51.2° to 40.6°

| | | | |
|---|---|---|---|
| r1 = ∞ | d1 = 1.50 | n1 = 1.51633 | ν1 = 64.1 |
| r2 = ∞ | d2 = 0.20 | | |
| r3 = 51.867 | d3 = 3.00 | n2 = 1.49171 | ν2 = 57.4 |
| r4 = 26.974 | d4 = 19.85 | | |
| r5 = −56.539 | d5 = 2.00 | n3 = 1.48749 | ν3 = 70.2 |
| r6 = 45.838 | d6 = 3.08 | | |
| r7 = 59.213 | d7 = 3.45 | n4 = 1.83400 | ν4 = 37.2 |
| r8 = 154.962 | d8 = Variable | | |
| r9 = 74.802 | d9 = 4.90 | n5 = 1.80610 | ν5 = 40.9 |
| r10 = −134.254 | d10 = 12.65 | | |
| r11 = 52.002 | d11 = 5.50 | n6 = 1.78590 | ν6 = 44.2 |
| r12 = −42.296 | d12 = 1.25 | n7 = 1.84666 | ν7 = 23.8 |
| r13 = 280.062 stop | d13 = Variable | | |
| r14 = −54.371 | d14 = 1.20 | n8 = 1.48749 | ν8 = 70.2 |
| r15 = 54.374 | d15 = Variable | | |
| r16 = 84.262 | d16 = 1.60 | n9 = 1.80518 | ν9 = 25.4 |
| r17 = 55.979 | d17 = 5.30 | | |
| r18 = −175.503 | d18 = 8.75 | n10 = 1.72000 | ν10 = 50.2 |
| r19 = −23.649 | d19 = 2.00 | n11 = 1.80518 | ν11 = 25.4 |
| r20 = −47.806 | d20 = 0.20 | | |
| r21 = −732.617 | d21 = 3.10 | n12 = 1.72000 | ν12 = 50.2 |
| r22 = −109.328 | d22 = Variable | | |
| r23 = 56.963 | d23 = 7.15 | n13 = 1.72000 | ν13 = 50.2 |
| r24 = −575.738 | d24 = 7.63 | | |
| r25 = ∞ | d25 = 32.00 | n14 = 1.51633 | ν14 = 64.1 |
| r26 = ∞ | | | |

TABLE 11-2

| Focal Length Variable Distance | 33.53 | 36.42 | 39.05 | 41.01 | 43.47 |
|---|---|---|---|---|---|
| d8 | 10.32 | 7.05 | 4.51 | 2.84 | 0.97 |
| d13 | 8.65 | 10.64 | 12.56 | 14.11 | 16.17 |
| d15 | 8.39 | 6.75 | 5.08 | 3.81 | 2.26 |
| d22 | 1.41 | 4.33 | 6.62 | 8.01 | 9.37 |

TABLE 11-3

| no | type | 1 | 2 | 3 | 4 | 5 | 6 |
|---|---|---|---|---|---|---|---|
| asph | 3 | r q 5.18670D+01 | k 2.14626D+00 | B 8.32331D−07 | C 1.30539D−08 | D 3.14710D−11 | E −8.41189D−15 |
| | | | A' −6.00650D−06 | B' −5.09640D−08 | C' −1.11983D−09 | D' 0.00000D+00 | E' 0.00000D+00 |
| | | | F −3.86795D−18 | G 0.00000D+00 | H 0.00000D+00 | | |
| | | | F' 0.00000D+00 | G' 0.00000D+00 | | | |

TABLE 12-1

Conventional Example
f = 48.42616 to 62.79    fno = 1:1.8 to 2.1    2ω = 51.2° to 40.6°

| | | | |
|---|---|---|---|
| r1 = 154.184 | d1 = 7.09 | n1 = 1.65844 | ν1 = 50.9 |
| r2 = −383.750 | d2 = 0.25 | | |
| r3 = 129.633 | d3 = 3.50 | n2 = 1.51633 | ν2 = 64.1 |
| r4 = 38.724 | d4 = 14.24 | | |
| r5 = −63.714 | d5 = 2.40 | n3 = 1.51633 | ν3 = 64.1 |
| r6 = 51.431 | d6 = 9.57 | | |
| r7 = 78.675 | d7 = 4.10 | n4 = 1.77250 | ν4 = 49.6 |
| r8 = 251.762 | d8 = Variable | | |
| r9 = 116.042 | d9 = 4.50 | n5 = 1.80610 | ν5 = 40.9 |
| r10 = −301.472 | d10 = 12.34 | | |
| r11 = 186.807 | d11 = 7.30 | n6 = 1.77250 | ν6 = 49.6 |

TABLE 12-1-continued

Conventional Example
f = 48.42616 to 62.79    fno = 1:1.8 to 2.1    2ω = 51.2° to 40.6°

| | | | |
|---|---|---|---|
| r12 = −45.867 | d12 = 1.80 | n7 = 1.84666 | ν7 = 23.8 |
| r13 = −126.387 stop | d13 = Variable | | |
| r14 = −49.192 | d14 = 1.50 | n8 = 1.48749 | ν8 = 70.2 |
| r15 = 49.192 | d15 = 3.33 | n9 = 1.62004 | ν9 = 36.3 |
| r16 = 73.754 | d16 = Variable | | |
| r17 = −339.501 | d17 = 13.16 | n10 = 1.69680 | ν10 = 55.5 |
| r18 = −30.700 | d18 = 2.40 | n11 = 1.84666 | ν11 = 23.8 |
| r19 = −58.798 | d19 = 0.25 | | |
| r20 = −3131.286 | d20 = 4.46 | n12 = 1.69680 | ν12 = 55.5 |
| r21 = −128.560 | d21 = Variable | | |
| r22 = 95.696 | d22 = 7.31 | n13 = 1.65844 | ν13 = 50.9 |
| r23 = −731.970 | d23 = 9.90 | | |
| r24 = ∞ | d24 = 45.00 | n14 = 1.51633 | ν14 = 64.1 |
| r25 = ∞ | | | |

TABLE 12-2

| Focal Length Variable Distance | 48.43 | 52.36 | 56.09 | 58.98 | 62.79 |
|---|---|---|---|---|---|
| d8 | 14.90 | 10.09 | 6.35 | 3.90 | 1.15 |
| d13 | 21.89 | 24.40 | 26.86 | 28.80 | 31.35 |
| d16 | 11.94 | 11.27 | 10.07 | 8.87 | 7.03 |
| d21 | 1.50 | 4.47 | 6.94 | 8.66 | 10.70 |

What is claimed is:

1. An image projection system for projecting a plurality of original images to substantially similar regions through separate projection optical systems, wherein following condition (1) is satisfied, $$|K1| < 0.25, \tag{1}$$

where $$K1 = -((L/\beta)/H) * DISmax * 0.0258/P$$

and

L: a maximum optical axis interval of said projection optical systems;

β: a projection magnification of each of said projection optical systems;

DISmax: a maximum value of absolute values of slope of distortion in the image height range of 0.25 to 1 when the maximum image height of said projection optical systems is normalized to 1;

H: a short-side length of each of the original images; and

P: a pixel pitch of each of the original images.

2. A system according to claim 1, wherein at least one of said projection optical systems and the original images is movable in a direction perpendicular to an optical axis of each of said projection optical systems.

3. A system according to claim 1, wherein the following condition is satisfied in an entire variable focal length range of each of said projection optical systems, $DIS\mathrm{max}<1.5.$ 4. A system according to claim 1, wherein distortion characteristics of said projection optical systems for projecting the plurality of original images are the same or substantially the same.

5. A system according to claim 1, wherein in said plurality of projection optical systems, letting S1 be a maximum interval (maximum shift amount) of intervals each between an optical axis of each projection optical system and a center of an original image projected by that projection optical system, and H be the short-side length of each of the original images, a ratio K2 (=S1/H) of S1 to H satisfies following condition (2), $0.35<|K2|<0.65.$ (2)

6. A system according to claim 1, wherein following condition (3) is satisfied, $|K1|<0.18.$ (3)

7. A system according to claim 1, wherein said projection optical systems each comprises a first lens unit having negative refracting power, a second lens unit having positive refracting power, a third lens unit having negative refracting power, a fourth lens unit having positive refracting power, and a fifth lens unit having positive refracting power sequentially from a screen side, and is designed to, in changing a focal length, move said second, third, and fourth lens units in a direction of optical axis and adjust a focal position in accordance with a change in a distance from the projection optical system to a screen by said first lens unit, said first lens unit having at least one aspherical lens.

8. A system according to claim 7, wherein said first lens unit has the aspherical surface on the screen side of a negative lens as a second component from the screen side.

9. A projection optical system used in said image projection system of claim 1, wherein a distortion value of distortion is substantially constant in a range of image height used for projection.

10. A system according to claim 9, wherein following condition is satisfied in an entire variable focal length range of said projection optical system, DISmax<1.5.

11. An image projection apparatus having said image projection system of claim 1.

12. An apparatus according to claim 11, wherein following condition is satisfied in an entire variable focal length range of each of said projection optical systems in said image projection system, DISmax<1.5.

* * * * *

UNITED STATES PATENT AND TRADEMARK OFFICE
CERTIFICATE OF CORRECTION

PATENT NO. : 6,508,555 B1  
DATED : January 21, 2003  
INVENTOR(S) : Saburo Sugawara It is certified that error appears in the above-identified patent and that said Letters Patent is hereby corrected as shown below:

<u>Title page, Item [54] and Column 1, lines 1-6,</u>  
Title, should read -- AN IMAGE PROJECTION SYSTEM THAT ENABLES ALMOST COMPLETE SUPERPOSITION WITHOUT ANY IMAGE SHIFT IN SUPERPOSITION PROJECTION OF ORGINAL IMAGES USING A PLURALITY OF IMAGE PROJECTION APPARATUSES --

<u>Column 4,</u>  
Line 57, "cation P common" should read -- cation β common --

<u>Column 5,</u>  
Line 33, Equation (4): "VΔ=vΔ(LQF)-vΔ(LQE)=DIST(LQF)*(Z-S2)-DIST(LQE)*(Z-S1()4)" should read -- VΔ=vΔ(LQF)-vΔ(LQE)=DIST(LQF)*(Z-S2)-DIST(LQE)*(Z-S1) (4) --

<u>Column 8,</u>  
Line 31, "nification p of" should read -- nification β of --

<u>Column 14,</u>  
Line 19, TABLE 10-1, third heading: "2ω=46.6° to 36.8°" should read -- 2w=46.6° to 36.8° --

<u>Column 15,</u>  
Line 5, TABLE 11-1, third heading: "2ω=51.2° to 40.6°" should read -- 2w=51.2° to 40.6° --  
Line 57, TABLE 12-1, third heading: "2ω=51.2° to 40.6°" should read -- 2w=51.2° to 40.6° --

UNITED STATES PATENT AND TRADEMARK OFFICE
CERTIFICATE OF CORRECTION

PATENT NO. : 6,508,555 B1
DATED : January 21, 2003
INVENTOR(S) : Saburo Sugawara It is certified that error appears in the above-identified patent and that said Letters Patent is hereby corrected as shown below:

<u>Column 16,</u>
Line 5, TABLE 12-1-continued, third heading: "2ω=51.2° to 40.6°" should read
-- 2w=51.2° to 40.6° --

Signed and Sealed this

Seventh Day of October, 2003

JAMES E. ROGAN
*Director of the United States Patent and Trademark Office*